United States Patent
Kim et al.

(10) Patent No.: US 10,521,303 B2
(45) Date of Patent: Dec. 31, 2019

(54) MEMORY SYSTEM FOR PERFORMING RAID RECOVERY AND A METHOD OF OPERATING THE MEMORY SYSTEM

(71) Applicant: SAMSUNG ELECTRONICS CO., LTD., Suwon-si, Gyeonggi-Do (KR)

(72) Inventors: Sang-Woo Kim, Suwon-si (KR); Chan-Ik Park, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 227 days.

(21) Appl. No.: 15/442,969

(22) Filed: Feb. 27, 2017

(65) Prior Publication Data
US 2018/0018233 A1    Jan. 18, 2018

(30) Foreign Application Priority Data
Jul. 15, 2016    (KR) .................... 10-2016-0090263

(51) Int. Cl.
*G06F 11/00*    (2006.01)
*G06F 11/10*    (2006.01)

(52) U.S. Cl.
CPC .................. *G06F 11/1096* (2013.01)

(58) Field of Classification Search
CPC .. G06F 11/108; G06F 11/1096; G06F 3/0619; G06F 3/0629; G06F 3/0647; G06F 3/0679; G06F 3/0688; G06F 11/08; G06F 11/1008; G06F 11/2247; G06F 21/44; G06F 21/70; G06F 21/73
See application file for complete search history.

(56) References Cited

U.S. PATENT DOCUMENTS

| | | | |
|---|---|---|---|
| 5,596,709 A * | 1/1997 | Bond | G06F 11/1084 714/6.32 |
| 8,327,066 B2 * | 12/2012 | Heo | G06F 12/0246 711/103 |
| 8,484,414 B2 | 7/2013 | Sugimoto et al. | |
| 8,572,440 B1 * | 10/2013 | Nunally | G06F 21/10 714/42 |
| 8,601,311 B2 | 12/2013 | Horn | |
| 8,677,203 B1 | 3/2014 | Shalvi et al. | |
| 8,812,901 B2 | 8/2014 | Sheffield, Jr. | |
| 9,026,729 B1 | 5/2015 | Hallak et al. | |
| 9,063,910 B1 | 6/2015 | Hallak et al. | |
| 9,251,019 B2 | 2/2016 | Losh et al. | |
| 9,286,002 B1 | 3/2016 | Karamcheti et al. | |
| 9,304,853 B2 * | 4/2016 | Thatcher | G06F 11/073 |

(Continued)

*Primary Examiner* — Michael Maskulinski
(74) *Attorney, Agent, or Firm* — F. Chau & Associates, LLC

(57) ABSTRACT

In a method of operating the memory system, the method includes detecting whether data of a read-out unit read from a first cell region has an error correction code (ECC) failure, in response to an external read-out request for the read-out unit, recovering and outputting the data of the read-out unit by performing Redundant Array of Inexpensive Disk (RAID) recovery by using data and RAID parity read from other cell regions, recovering a plurality of pieces of data stored in the first cell region by performing the RAID recovery using the data and RAID parity read from the other cell regions, and migrating the recovered plurality of pieces of data to a second cell region in units of cell regions.

19 Claims, 25 Drawing Sheets

(56) References Cited

U.S. PATENT DOCUMENTS

| | | | | |
|---|---|---|---|---|
| 2003/0088805 A1* | 5/2003 | Majni | .................. | G06F 11/108 |
| | | | | 714/5.1 |
| 2010/0162037 A1* | 6/2010 | Maule | .................. | G06F 11/106 |
| | | | | 714/5.11 |
| 2011/0035540 A1* | 2/2011 | Fitzgerald | ............... | G06F 3/061 |
| | | | | 711/103 |
| 2011/0066793 A1* | 3/2011 | Burd | .................. | G06F 11/1028 |
| | | | | 711/103 |
| 2012/0059978 A1* | 3/2012 | Rosenband | ........... | G06F 3/0613 |
| | | | | 711/103 |
| 2013/0340068 A1* | 12/2013 | Lee | ........................ | G06F 21/44 |
| | | | | 726/16 |
| 2014/0089725 A1* | 3/2014 | Ackaret | ............. | G06F 12/0653 |
| | | | | 714/6.1 |
| 2014/0189212 A1 | 7/2014 | Slaight et al. | | |
| 2014/0380092 A1* | 12/2014 | Kim | ..................... | G06F 11/108 |
| | | | | 714/6.24 |
| 2015/0301895 A1* | 10/2015 | Dennett | ............. | G06F 11/1092 |
| | | | | 714/6.24 |
| 2016/0062696 A1* | 3/2016 | Cerrelli | ................ | G06F 3/0638 |
| | | | | 711/202 |
| 2016/0110255 A1* | 4/2016 | Yun | ..................... | G06F 11/1012 |
| | | | | 714/766 |
| 2016/0170907 A1* | 6/2016 | Walsh | .................. | H04L 9/0866 |
| | | | | 713/193 |

\* cited by examiner

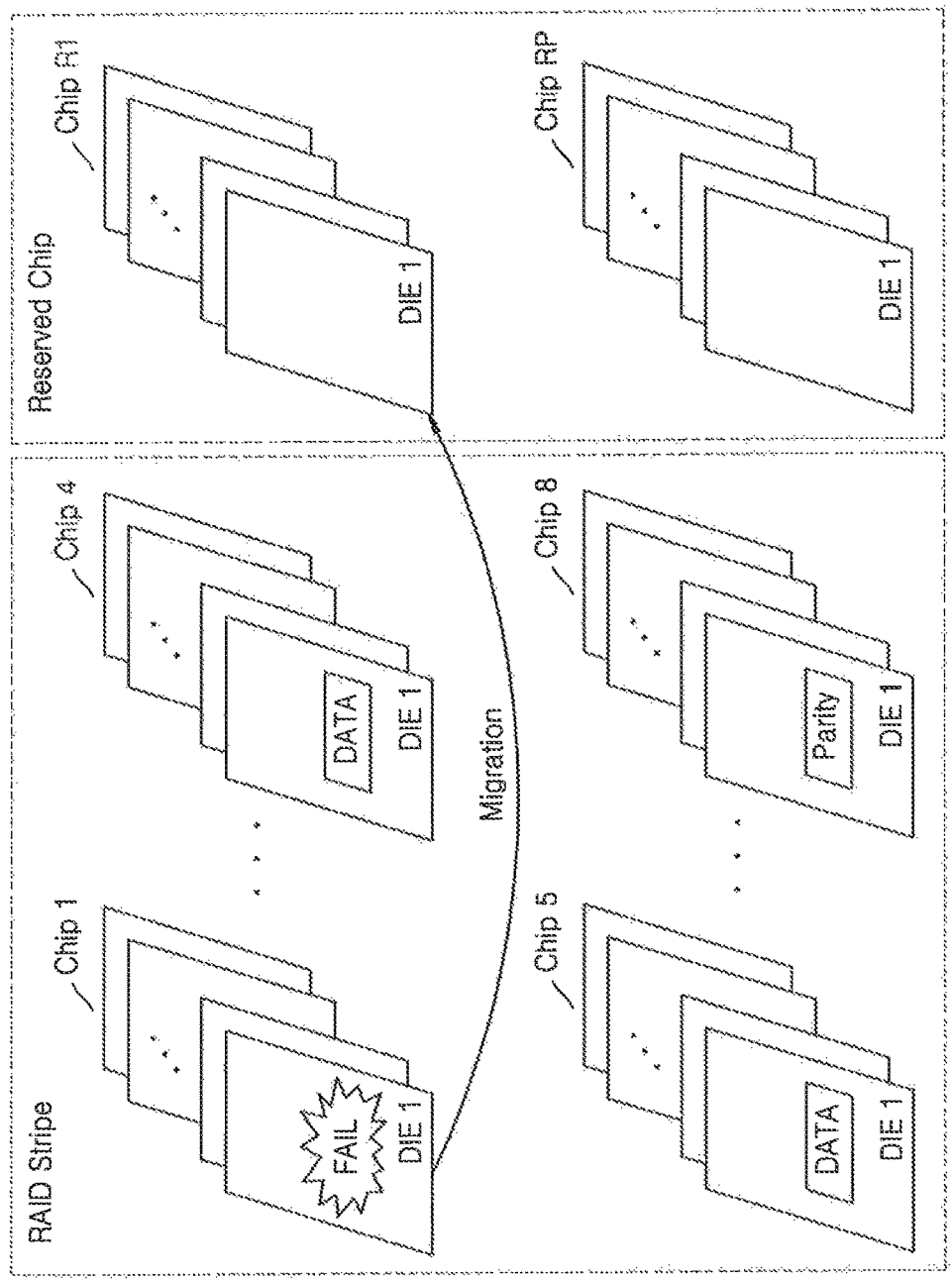

RAID 6 → RAID 5 or RAID 4

RAID 5 or RAID 4 → RAID X

FIG. 11B

| Logical | Physical | L2P Table |
|---|---|---|
| ~~DIE_ADD_L1~~ | ~~DIE_ADD_P1 (DIE A)~~ | |
| DIE_ADD_L1 | DIE_ADD_PR1 (DIE R1) | |

(a)

| | Logical | Physical |
|---|---|---|
| Plane 1 { | ~~Page_ADD_L1~~ | ~~Page_ADD_P1~~ |
| | ⋮ | ⋮ |
| | ~~Page_ADD_LD~~ | ~~Page_ADD_PD~~ |
| Plane R1 { | Page_ADD_L1 | Page_ADD_PR1 |
| | ⋮ | ⋮ |
| | Page_ADD_LD | Page_ADD_PRD |

(b)

MEMORY SYSTEM FOR PERFORMING RAID RECOVERY AND A METHOD OF OPERATING THE MEMORY SYSTEM

CROSS-REFERENCE TO RELATED APPLICATION

This application claims priority under 35 U.S.C. § 119 to Korean Patent Application No. 10-2016-0090263, filed on Jul. 15, 2016 in the Korean Intellectual Property Office, the disclosure of which is incorporated by reference herein in its entirety.

TECHNICAL FIELD

Exemplary embodiments of the inventive concept relate to memory systems, and more particularly, to a memory system for performing a redundant array of inexpensive disk (RAID) recovery and a method of operating the memory system.

DISCUSSION OF RELATED ART

There are various techniques for increasing the stability of data in memory systems. For example, memory systems may support Redundant Array of Inexpensive Disks (RAID), and the stability of data may be secured through various methods according to RAID levels. In a memory system including a plurality of cell regions, data recovery may be achieved by performing RAID recovery using data and RAID parity distributed and stored in the plurality of cell regions.

In the RAID recovery, the data and RAID parity of the plurality of cell regions are read, and a calculation is performed using the read-out data and RAID parity. However, the lifespan of the memory system may be reduced due to the frequency of read-out operations of the cell regions for the RAID recovery, and accordingly, the time taken to perform the RAID recovery increases.

SUMMARY

According to an exemplary embodiment of the inventive concept, in a method of operating a memory system, the method includes detecting whether data of a read-out unit read from a first cell region has an error correction code (ECC) failure, in response to an external read-out request for the read-out unit, recovering and outputting the data of the read-out unit by performing Redundant Array of Inexpensive Disk (RAID) recovery by using data and RAID parity read from other cell regions, recovering a plurality of pieces of data stored in the first cell region by performing the RAID recovery using the data and RAID parity read from the other cell regions, and migrating the recovered plurality of pieces of data to a second cell region in units of cell regions.

According an exemplary embodiment of the inventive concept, in a method of operating a memory system, the memory system includes M data cell regions for storing data and N parity cell regions for storing parity corresponding to the data, where M is an integer greater than or equal to 2 and N is an integer greater than or equal to 1. The method includes detecting a failure of a first data cell region among the M data cell regions, recovering a plurality of pieces of data stored in the first data cell region via a recovery operation using data stored in other data cell regions among the M data cell regions and parity stored in the N parity cell regions, and migrating the recovered plurality of pieces of data of the first data cell region to a first parity cell region among the N parity cell regions.

According to an exemplary embodiment of the inventive concept, in a method of operating a memory system, the method includes receiving a read-out request from a host, calculating a physical address on which a read operation, corresponding to the read-out request, is to be performed, determining whether a first cell region, corresponding to the physical address, is failed, recovering a requested portion of data of the first cell region by performing a first Redundant Array of Inexpensive Disk (RAID) recovery using data and RAID parity read from other cell regions, when it is determined that the first cell region is failed, reading the requested portion of the data of the first cell region when it is determined that the first cell region is not failed, and outputting the requested portion of the data of the first cell region to the host. The method further includes recovering a predetermined region of data of the first cell region having a size different from the requested portion by performing a second RAID recovery, when it is determined that the first cell region is failed.

BRIEF DESCRIPTION OF THE DRAWINGS

The above and other features of the inventive concept will be more clearly understood by describing in detail exemplary embodiments thereof with reference to the accompanying drawings.

FIGS. 5, 6A, 6B, and 7A-7C are diagrams illustrating various examples of redundant array of inexpensive disk (RAID) migration according to exemplary embodiments of the inventive concept.

FIGS. 11A and 11B are block diagrams of a memory system that illustrate an example in which data migration is performed according to a software method, according to an exemplary embodiment of the inventive concept.

DETAILED DESCRIPTION OF THE EMBODIMENTS

Figure 1:
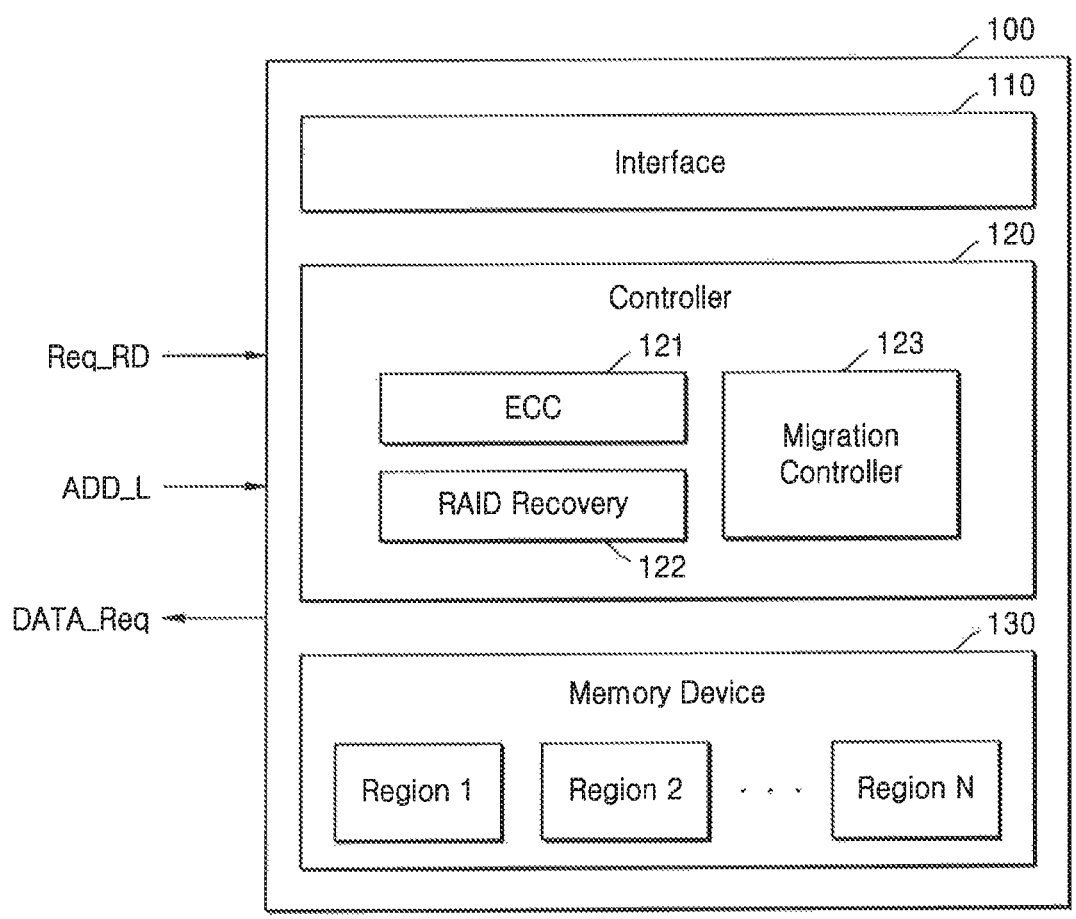
FIG. 1 is a block diagram of a memory system according to an exemplary embodiment of the inventive concept.

Exemplary embodiment of the inventive concept will be described more fully hereinafter with reference to the accompanying drawings. Like reference numerals may refer to like elements throughout this application.

Exemplary embodiments of the inventive concept provide a memory system capable of securing data stability via a redundant array of inexpensive disk (RAID) recovery, increasing a data read-out speed, and providing an increased lifespan, as well as a method of operating the memory system.

FIG. 1 is a block diagram of a memory system 100 according to an exemplary embodiment of the inventive concept.

Referring to FIG. 1, the memory system 100 may include an interface 110 communicating with a host, a controller 120 controlling the entire memory operation, and a memory device 130 storing data. The memory system 100 may store or read data DATA in response to a memory access request from the host. The memory system 100 may receive a logical address ADD_L from the host and access data DATA of a physical region corresponding to the logical address ADD_L. When a request from the host is a read-out request Req_RD, the memory system 100 may output read-out data DATA_Req, corresponding to the request, to the host.

The memory system 100 may communicate with at least one host via the interface 110 and may perform a data access operation in response to a request from the host. According to an exemplary embodiment of the inventive concept, the memory system 100 may communicate with the host via various interface protocols, such as Universal Serial Bus (USB), Multi-Media card (MMC), Peripheral Component Interconnect-Express (PCI-E), Advanced Technology Attachment (ATA), Serial ATA (SATA), Parallel ATA (PATA), Small Computer System Interface (SCSI), Serial Attached SCSI (SAS), Enhanced Small Device Interface (ESDI), or Intelligent Drive Electronics (IDE).

The memory device 130 may include at least one storage medium. For example, the memory device 130 may include at least one hard disk drive (HDD) or solid state drive (SSD). Alternatively, the memory device 130 may include a plurality of memory chips. For example, the plurality of memory chips may store data in a nonvolatile manner. As another example, the memory device 130 may include at least one flash memory chip. Each memory chip may include a plurality of dies stacked on top of one another.

According to an exemplary embodiment of the inventive concept, when the memory system 100 is implemented using a single memory chip, the controller 120 and the memory device 130 may be included in the single memory chip, and the memory device 130 may include the plurality of dies.

Storage media included in the memory device 130 may be classified into cell regions Region 1 through Region N, which are a plurality of storage spaces. Each cell region may be variously defined. For example, the size of each cell region may be variously defined.

Figure 2A:
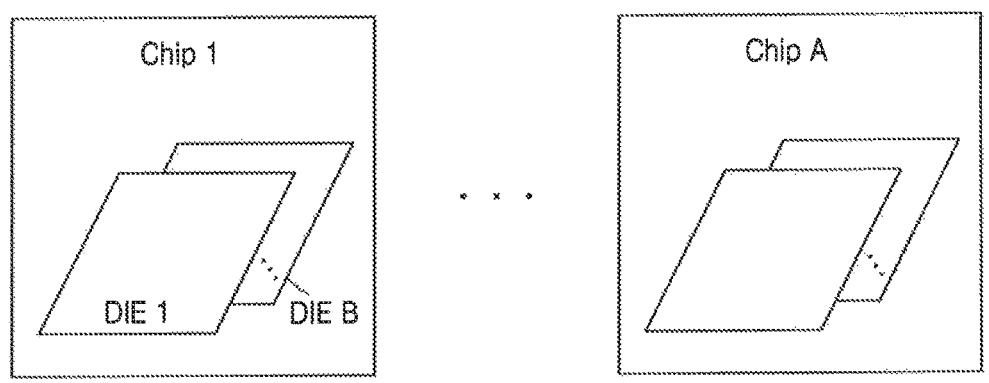
FIGS. 2A, 2B, and 2C are diagrams of a memory device included in the memory system of FIG. 1 according to exemplary embodiments of the inventive concept.
Figure 2B:
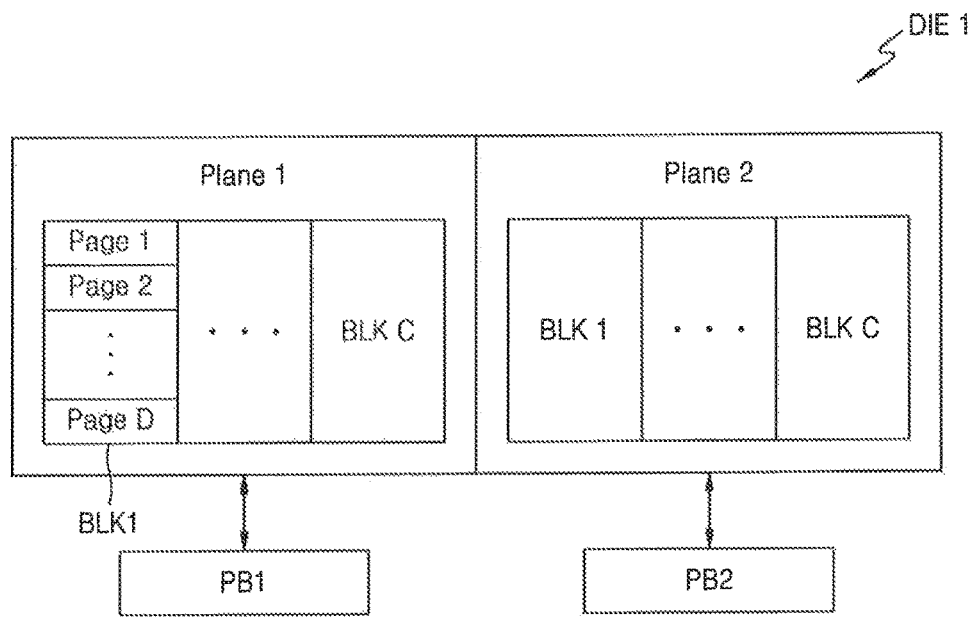
Figure 2C:
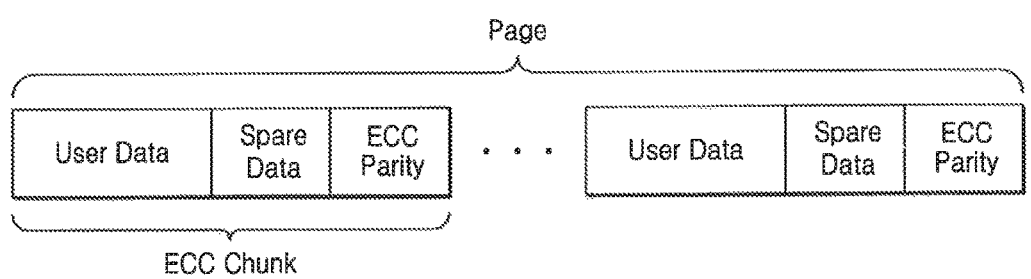

FIGS. 2A, 2B, and 2C are diagrams of the memory device 130 of FIG. 1 according to exemplary embodiments of the inventive concept.

Referring to FIG. 2A, the memory device 130 may include a plurality of memory chips Chip 1 through Chip A. According to an exemplary embodiment of the inventive concept, each of the memory chips Chip 1 through Chip A may include various types of memory cells, for example, nonvolatile flash memory cells. According to an exemplary embodiment of the inventive concept, the cell regions Region 1 through Region N of the memory device 130 of FIG. 1 may each correspond to a memory chip. In this case, the number of memory chips Chip 1 through Chip A may correspond to the number of cell regions Region 1 through Region N.

Each of the memory chips Chip 1 through Chip A may include a plurality of dies DIE 1 through DIE B. For example, each of the memory chips Chip 1 through Chip A may correspond to a semiconductor package including the plurality of dies DIE 1 through DIE B. According to an exemplary embodiment of the inventive concept, each of the cell regions Region 1 through Region N of the memory device 130 of FIG. 1 may correspond to a die. In this case, the total number of dies included in the memory chips Chip 1 through Chip A may correspond to the number of cell regions Region 1 through Region N.

FIG. 2B illustrates a storage space included in a single die according to an exemplary embodiment of the inventive concept. For example, the first die DIE 1 may include a plurality of planes. In FIG. 2B, the first die DIE 1 includes first and second planes Plane 1 and Plane 2. Each of the first and second planes Plane 1 and Plane 2 may include a plurality of cell blocks BLK 1 through BLK C.

The above-described plane may be variously defined. For example, page buffers PB1 and PB2 that temporarily store data to be written and read may be included in the memory device 130. Page buffers may be arranged in units of planes. In other words, data of the first and second planes Plane 1 and Plane 2 may be simultaneously read out and stored in the page buffers PB1 and PB2, respectively, and data to be written may be provided to the first and second planes Plane 1 and Plane 2 via the page buffers PB1 and PB2, respectively. In the present exemplary embodiment, each of the cell regions Region 1 through Region N of the memory device 130 may correspond to a plane.

Each of the cell blocks BLK 1 through BLK C may include a plurality of pages Page 1 through Page D. Each of the pages Page 1 through Page D may correspond to a unit in which data is written or read in a single cell block (hereinafter, referred to as a write or read-out unit). According to the exemplary embodiments as described above, each of the cell regions Region 1 through Region N may have a larger size than the write or read-out unit of data. For example, each of the cell regions Region 1 through Region N may have a size to include a plurality of pages (e.g., at least two).

FIG. 2C illustrates a structure of the data stored in a page according to an exemplary embodiment of the inventive concept. Referring to FIG. 2C, a page (e.g., one of the plurality of pages Page 1 to Page D) may store one or more data in error correction code (ECC) units (or ECC chunks). For example, a single ECC chunk may include user data, spare data, and ECC parity. The spare data may include, for example, metadata representing the property of the user data, and the ECC parity may be used to correct an error generated in the data included in the ECC chunk. For example, an error generated in at least one bit of data during a read operation of a page may be corrected via an error correction operation using the ECC parity.

Referring back to FIG. 1, a data redundancy design may be applied to the memory system 100 to secure data stability. The data redundancy design may be defined as a design capable of recovering data via information stored in other storage media even when a failure is generated in some storage media. An example of the data redundancy design is Redundant Array of Inexpensive Disks (RAIDs). Data recovery may be performed by storing copied data corresponding to the original data in a special storage medium or storing parity corresponding to the original data in a special storage medium according to the levels of the RAID.

A plurality of pieces of data and at least one RAID parity may constitute a single RAID stripe. For example, each RAID stripe may include data, which is stored in a plurality of pages, and RAID parity, corresponding to the data that is stored in at least one page. Accordingly, each RAID stripe may have a size which is an integer multiple of a page. A plurality of RAID stripes may be stored in the memory device 130.

Hereinafter, it will be assumed that a page is the unit in which data is read and that each of the plurality of pieces of data and RAID parity included in a single RAID stripe has a page size. However, the inventive concept is not limited thereto. For example, the data and RAID parity that constitute a RAID stripe may each have a size corresponding to a portion of a page, or may each have a size corresponding to at least two pages.

The plurality of pieces of data and at least one RAID parity that constitute a RAID stripe may be distributed and stored in at least some of the cell regions Region 1 through Region N. For example, when each RAID stripe includes 'a' number of pieces of data, where 'a' is an integer greater than or equal to 1, and 'b' RAID parities, where 'b' is an integer greater than or equal to 1, the 'a' data may be distributed and stored in 'a' cell regions (or data cell regions), among the cell regions Region 1 through Region N, and the 'b' RAID parities may be distributed and stored in 'b' cell regions (or parity cell regions), among the remaining of cell regions Region 1 through Region N.

When data is not able to be normally read-out because one cell region (for example, a second cell region Region 2) failed, RAID recovery may be performed using data and RAID parity stored in the remaining cell regions that constitute the RAID stripe together with the failed cell region Region 2. The RAID recovery may be performed based on a calculation using the read-out data and the read-out RAID parity, and the data of the second cell region Region 2 may be recovered and output due to the execution of the RAID recovery.

Figure 3:
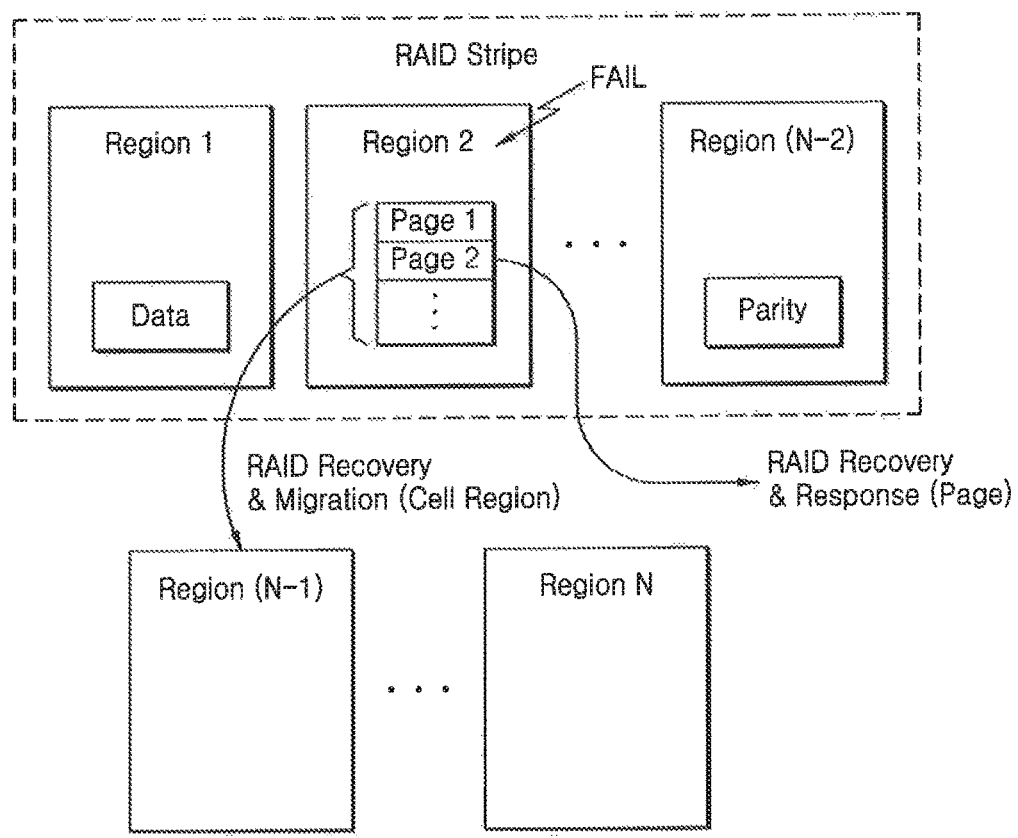
FIG. 3 is a diagram illustrating migrating recovered data in units of cell regions according to an exemplary embodiment of the inventive concept.

Data migration according to an exemplary embodiment of the inventive concept will now be described in detail with reference to FIGS. 1 and 3. FIG. 3 is a diagram illustrating recovering data in units of cell regions via RAID recovery and migrating recovered data in units of cell regions. According to the present exemplary embodiment, the migration of the recovered data may be referred to as RAID migration because the migration of the recovered data corresponds to migration of data recovered via RAID recovery.

The memory device 130 may include at least one reserved cell region. For example, it is assumed that the first through (N−2)th cell regions Region 1 through Region (N−2), among the cell regions Region 1 through Region N, store the data and RAID parity that constitute a RAID stripe and that the two remaining cell regions Region (N−1) and Region N correspond to reserved cell regions. The RAID stripe may include (N−1) data and one RAID parity, and the RAID parity may be stored in the (N−2)th cell region Region (N−2). Data migration when the second cell region Region 2 fails will now be described below.

In response to a read-out request for the second cell region Region 2, data of a read-out unit (for example, a page) and ECC parity corresponding to the data are read from the second cell region Region 2, and an error correction operation using the ECC parity is performed. As the second cell region Region 2 fails, the error correction operation with respect to the data read from the second cell region Region 2 may fail, and accordingly, RAID recovery for recovering the data stored in the second cell region Region 2 may be performed. For example, other data and RAID parity that constitute the RAID stripe together with the requested read-out data are read from the first cell region Region 1 and third through (N−2)th cell regions Region 3 to Region (N−2). Via RAID recovery using the read-out data and the read-out RAID parity, the data requested by the host to be read may be recovered, and the recovered data may be output as a response to the read-out request from the host.

Additionally, RAID recovery in units of cell regions is performed with respect to the second cell region Region 2 that includes the page having an ECC failure. For example, the plurality of pieces of data of the second cell region Region 2 may be recovered by performing RAID recovery on each of the plurality of pages included in the second cell region Region 2. Data of the recovered second cell region Region 2 may migrate to at least one of the reserved cell regions Region (N−1) and Region N. For example, the migration of the recovered data may include an operation of storing the data of the recovered second cell region Region 2 in one reserved cell region (e.g., Region (N−1)). Further, as the data of the second cell region Region 2 migrates to the reserved cell region (e.g., Region (N−1)), mapping information, representing a storage location of the data of the second cell region Region 2 within the memory system 100, may be changed.

According to the present exemplary embodiment, through RAID recovery, data corresponding to the read-out unit is output to the host, and simultaneously, data with respect to each failed cell region migrates to another cell region having no failures. Accordingly, recovered, normal data may be provided to the host in response to the read-out request from the host, and, even when a subsequent read operation with respect to the failed cell region is later requested, normal data may be read without performing the RAID recovery. Further, since it is not necessary to frequently read the data and parity of the plurality of cell regions to perform RAID recovery, reduction in the lifespan of the memory system 100 may be prevented.

According to an exemplary embodiment of the inventive concept, the memory system 100 may determine the timings to execute RAID recovery and data migration in units of cell regions. For example, the memory system 100 may determine a work load of a currently pending operation and may control the timings to execute the RAID recovery and data migration according to a result of the determination.

According to an exemplary embodiment of the inventive concept, the memory system 100 may determine the necessity for executing RAID recovery with respect to a cell region. For example, when an ECC failure that is unable to undergo error correction using ECC parity occurs in one page of a specific cell region, the memory system 100 may determine that execution of RAID recovery in units of cell regions is necessary. According to an exemplary embodiment of the inventive concept, the memory system 100 may determine whether RAID recovery in units of cell regions is necessary based on whether the number of pages with ECC failure in the specific cell region exceeds a threshold value.

Referring back to FIG. 1, the controller 120 may include an error correction circuit (ECC) 121, a RAID recovery circuit 122, and a migration controller 123. The ECC 121 may perform the error correction operation based on ECC parity, with respect to data corresponding to an error correction unit (e.g., the unit in which data is error-corrected). The RAID recovery circuit 122 may perform RAID recovery by using the data and RAID parity that constitute the RAID stripe. For example, the RAID recovery circuit 122 may perform the RAID recovery based on a calculation using the data and RAID parity of the RAID stripe.

The migration controller 123 may control an operation of migrating data recovered via the RAID recovery. For example, when the memory system 100 includes a reserved cell region, the migration controller 123 may control the migration operation so that the recovered data is stored in the reserved cell region. According to an exemplary embodiment of the inventive concept, when the memory system 100 includes no reserved cell regions or all of the reserved cell regions included in the memory system 100 are in use, the migration controller 123 may control the migration operation so that the recovered data is stored in a cell region other than the failed cell region. For example, recovered data of the failed cell region may migrate to a cell region that stores RAID parity. At this time, the RAID parity previously stored in the cell region to which the recovered data is to migrate (for example, a target cell region) may be deleted. Alternatively, each cell region of the memory system 100 may further include an over-provisioning (OP) region in addition to a user region for storing data corresponding to actual user capacity. In this case, the migration controller 123 may control the migration operation so that the recovered data is stored in the OP region of a cell region other than the failed cell region (e.g., the target cell region).

According to the above-described exemplary embodiment of the inventive concept, the ECC function, RAID recovery function, and data migration function of the controller 120 are implemented by hardware. However, the inventive concept is not limited thereto. For example, the controller 120 may include a processing unit and a memory (for example, a working memory) for storing software, and the software stored in the working memory may include programs for the ECC function, the RAID recovery function, and the data migration function. In other words, the processing unit executes the programs stored in the working memory, and thus, the ECC function, the RAID recovery function, and the data migration function, according to the above-described exemplary embodiment, may be executed.

Figure 4:
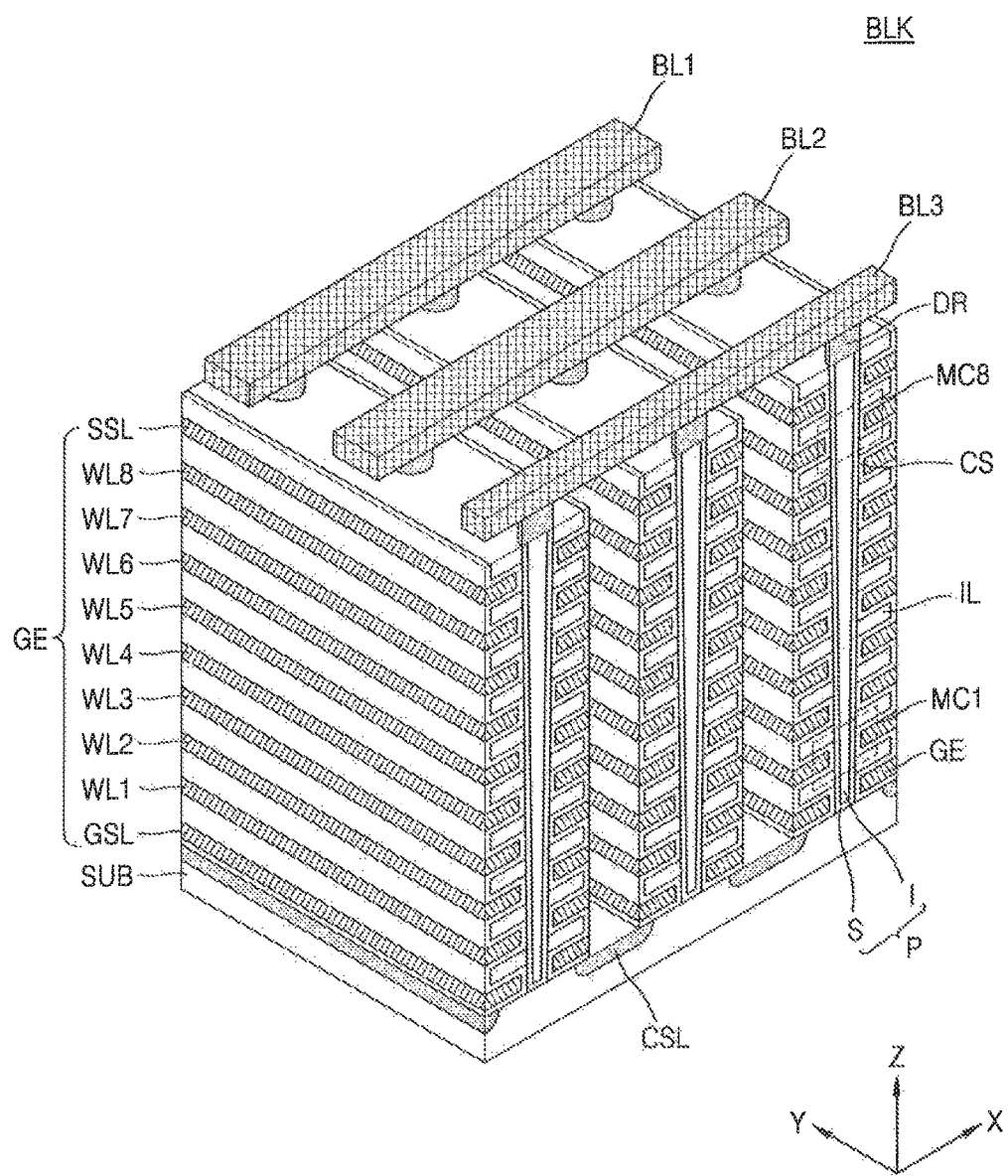
FIG. 4 illustrates a cell region of the memory device of FIG. 1 according to an exemplary embodiment of the inventive concept.

FIG. 4 illustrates a cell region of the memory device 130 of FIG. 1 according to an exemplary embodiment of the inventive concept. When the memory device 130 includes a flash memory chip, FIG. 4 illustrates an example in which a cell block of the flash memory chip is implemented in a three-dimensional (3D) form.

Referring to FIG. 4, a cell block BLK is formed in a vertical direction (e.g., a Z direction) with respect to a substrate SUB. Although the cell block BLK includes two selection lines GSL and SSL, eight word lines WL1 through WL8, and three bit lines BL1 through BL3 in FIG. 4, the numbers of selection lines, word lines, and bit lines may be vary.

The substrate SUB is of a first conductivity type (for example, a p type), and common source lines CSL each extending in a first direction (for example, a Y direction) and doped with impurities of a second conductivity type (for example, an n type) are provided on the substrate SUB. On a region of the substrate SUB between every two adjacent common source lines CSL, a plurality of insulation layers IL each extending in the first direction are sequentially provided in a third direction (e.g., the Z direction), and the plurality of insulation layers IL are spaced apart from one another by a certain distance in the third direction. For example, the plurality of insulation layers IL may include an insulative material such as silicon oxide.

On the region of the substrate SUB between two adjacent common source lines CSL, a plurality of pillars P are sequentially arranged in the first direction and penetrate through the plurality of insulation layers IL in the third direction. For example, the plurality of pillars P penetrate through the plurality of insulation layers IL and contact the substrate SUB. In detail, a surface layer S of each pillar P may include a silicon material of the first conductivity type and may function as a channel region. An internal layer I of each pillar P may include an insulative material, such as silicon oxide, or an air gap.

In a region between two adjacent common source lines CSL, a charge storage layer CS is provided along exposed surfaces of the insulation layers IL, the pillars P, and the substrate SUB. The charge storage layer CS may include a gate insulation layer (or a tunnel insulation layer), a charge trapping layer, and a blocking insulation layer. For example, the charge storage layer CS may have an oxide-nitride-oxide (ONO) structure. In the region between two adjacent common source lines CSL, a gate electrode GE, such as the selection lines GSL and SSL and the word lines WL1 through WL8, is also provided on an exposed surface of the charge storage layer CS.

Drains or drain contacts DR are provided on the plurality of pillars P. For example, the drains or drain contacts DR may include a silicon material doped with impurities of the second conductivity type. The bit lines BL1 through BL3, each extending in the second direction (for example, an X direction) and spaced apart from each other by a certain distance in the first direction, are provided on the drains DR.

Additionally, the cell block BLK includes a plurality of memory cells (e.g., first to eighth memory cells MC1 to MC8). For example, the first memory cell MC1 may be defined by portions of the gate electrode, the pillar P, the insulation layer IL, and the charge storage layer CS.

FIGS. 5, 6A, 6B, and 7A-7C are diagrams illustrating various examples of RAID migration according to exemplary embodiments of the inventive concept. It is assumed that a memory system of FIGS. 5 and 7A-7C includes a reserved cell region.

Figure 5:
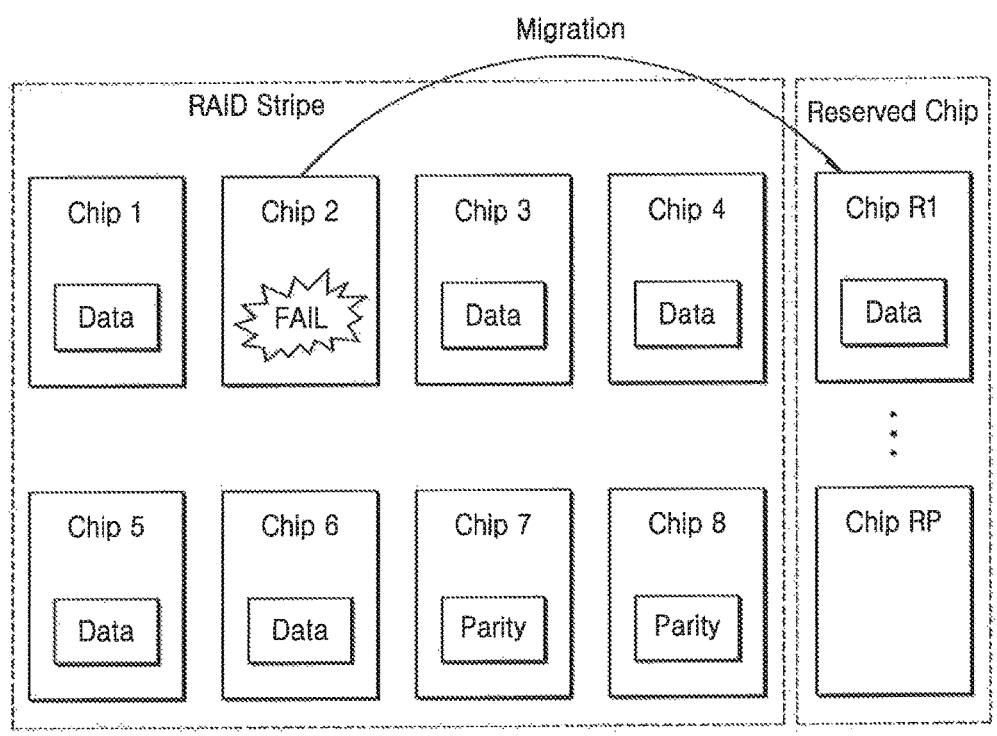

Referring to FIG. 5, the above-described cell region is a memory chip, and data is used in units of memory chips. For example, the data and RAID parity that constitute the RAID stripe may be distributed and stored in first through eighth memory chips Chip 1 through Chip 8. For example, the first through sixth memory chips Chip 1 through Chip 6 may store the data, and the seventh and eighth memory chips Chip 7 and Chip 8 may store the RAID parity. The memory system may further include at least one memory chip as a reserved memory chip, for example, first through P-th reserved memory chips Chip R1 through Chip RP.

Assuming that one memory chip, e.g., the second memory chip Chip 2, fails, the data of the second memory chip Chip 2 is unable to undergo the error correction operation using the ECC parity stored in the second memory chip Chip 2. Accordingly, as the read-out request for the data stored in the second memory chip Chip 2 is received from a host and it is determined that data error correction using ECC parity is impossible, the data and RAID parity of the RAID stripe are read from other memory chips (e.g., the first memory chip Chip 1 and third through eighth memory chips Chip 3 to Chip 8). The data requested by the host to be read may be recovered via RAID recovery using the read-out data and the read-out RAID parity. In response to the read-out request from the host, the recovered data may be provided to the host.

Further, according to an exemplary embodiment of the inventive concept, the RAID recovery may be performed on the failed second memory chip Chip 2, and data of the recovered second memory chip Chip 2 may migrate to at least one reserved memory chip, among the first through P-th reserved memory chips Chip R1 to Chip RP. For example, the data of the plurality of pages included in the second memory chip Chip 2 may be sequentially recovered via RAID recovery regardless of a request from the host, and the data of the recovered plurality of pages may sequentially migrate to the at least one reserved memory chip.

FIG. 5 illustrates an example in which the data of the recovered second memory chip Chip 2 migrates to the first reserved memory chip Chip R1.

Thereafter, when a read-out request for the second memory chip Chip 2 is received from the host, the memory system may read data from the first reserved memory chip Chip R1 and provide the read data to the host.

Figure 6B:
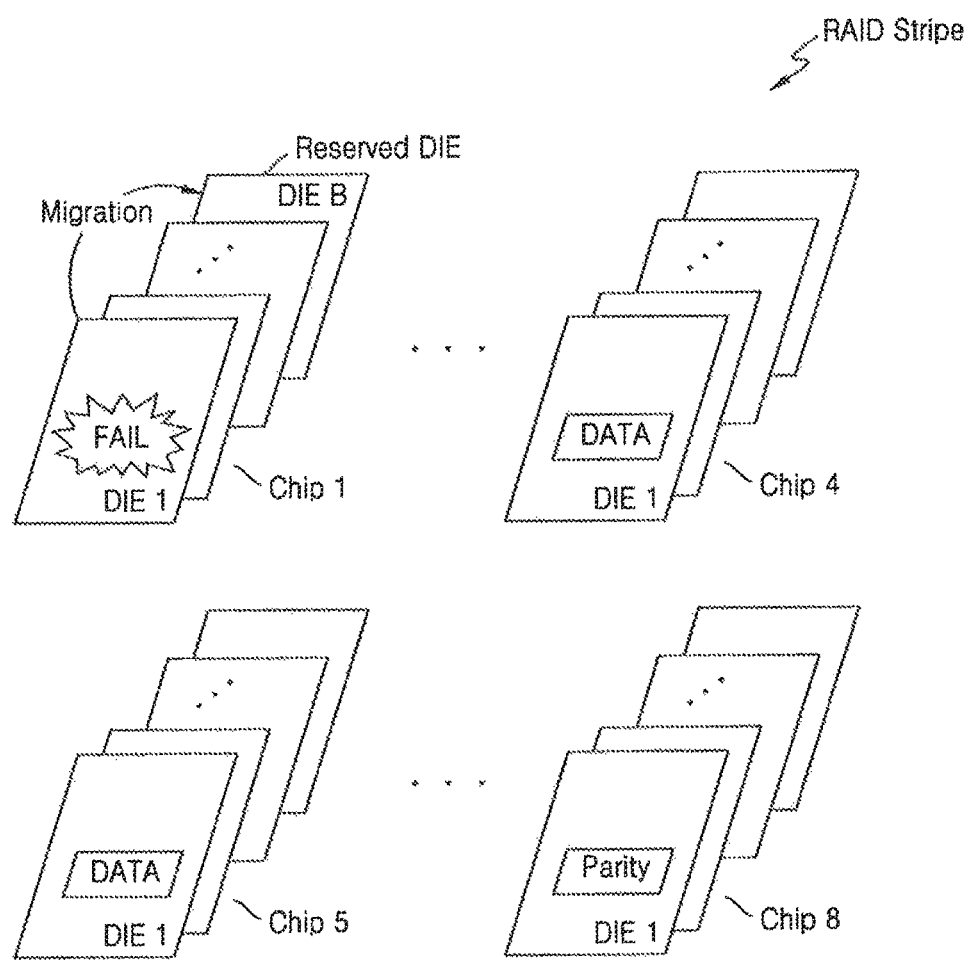

FIGS. 6A and 6B illustrate an example of data migration in units of dies according to an exemplary embodiment of the inventive concept. In the example of FIGS. 6A and 6B, the above-described cell region may correspond to a die.

Referring to FIG. 6A, the data and RAID parity that constitute the RAID stripe may be distributed and stored in the first through eighth memory chips Chip 1 through Chip 8. For example, each of the first through eighth memory chips Chip 1 through Chip 8 may include a plurality of dies, and the data and RAID parity of the RAID stripe may be distributed and stored in the dies (for example, the first dies DIE 1) of the first through eighth memory chips Chip 1 through Chip 8. It is assumed that, for illustrative purposes, the first die DIE 1 of the first memory chip Chip 1 has failed and it is impossible to error-correct the data stored in the first die DIE 1 by using ECC parity.

When the first die DIE 1 of the first memory chip Chip 1 fails, RAID recovery may be performed in units of dies. For example, the data and RAID parity may be read from first dies DIE 1 of the second through eighth memory chips Chip 2 through Chip 8, and the data of the plurality of pages of the first die DIE 1 of the first memory chip Chip 1 may be recovered via RAID recovery. The data of the first die DIE 1 of the recovered first memory chip Chip 1 may migrate to at least one die of a reserved memory chip. For example, FIG. 6A illustrates an example in which the data of the first die DIE 1 of the recovered first memory chip Chip 1 migrates to the first die DIE 1 of the first reserved memory chip Chip R1. Thereafter, when a read-out request for the first die DIE 1 of the first memory chip Chip 1 is received from the host, the memory system may read data from the first die DIE 1 of the first reserved memory chip Chip R1 and provide the read data to the host.

FIG. 6B illustrates an example in which data migration is performed in units of dies when no reserved memory chips are included in a memory system, according to an exemplary embodiment of the inventive concept.

Referring to FIG. 6B, the memory system may include the first through eighth memory chips Chip 1 through Chip 8, and each of the first through eighth memory chips Chip 1 through Chip 8 may include a plurality of dies. At least one of the plurality of dies included in each memory chip may be used as a reserved cell region. In the example of FIG. 6B, each of the first through eighth memory chips Chip 1 through Chip 8 includes B dies DIE 1 through DIE B, and the B-th die DIE B is used as the reserved cell region (or reserved die).

Similar to the above-described exemplary embodiments, it is assumed that the data and RAID parity that constitute the RAID stripe are distributed and stored in the dies (for example, first dies DIE 1) of the first through eighth memory chips Chip 1 through Chip 8, and that the first die DIE 1 of the first memory chip Chip 1 has failed.

When the first die DIE 1 of the first memory chip Chip 1 fails, the RAID recovery may be performed using the data and RAID parity read from the first dies DIE 1 of the second through eighth memory chips Chip 2 through Chip 8, and accordingly, the data of the plurality of pages of the first die DIE 1 of the first memory chip Chip 1 may be recovered. The data of the first die DIE 1 of the recovered first memory chip Chip 1 may migrate to a reserved die (e.g., the B-th die DIE B) of at least one memory chip, among the first through eighth memory chips Chip 1 through Chip 8.

In the example of FIG. 6B, the data of the first die DIE 1 of the recovered first memory chip Chip 1 migrates to the B-th die DIE B of the same memory chip (e.g., the first memory chip Chip 1). Accordingly, the data and RAID parity stored in the B-th die DIE B of the first memory chip Chip 1 and in the first dies DIE 1 of the second through eighth memory chips Chip 2 through Chip 8 may constitute the RAID stripe. Thereafter, when a read-out request for the first die DIE 1 of the first memory chip Chip 1 is received from the host, the memory system may read the data from the B-th die DIE B of the first memory chip Chip 1 and provide the read data to the host.

In the example of FIG. 6B, the data of the first die DIE 1 recovered via RAID recovery migrates to a reserved die (e.g., the B-th die DIE B) of the same memory chip (e.g., the first memory chip Chip 1) to which the first die DIE1 belongs. However, the inventive concept is not limited thereto. For example, the data of the first die DIE 1 of the first memory chip recovered via RAID recovery may migrate to a reserved die of another memory chip.

Figure 7A:
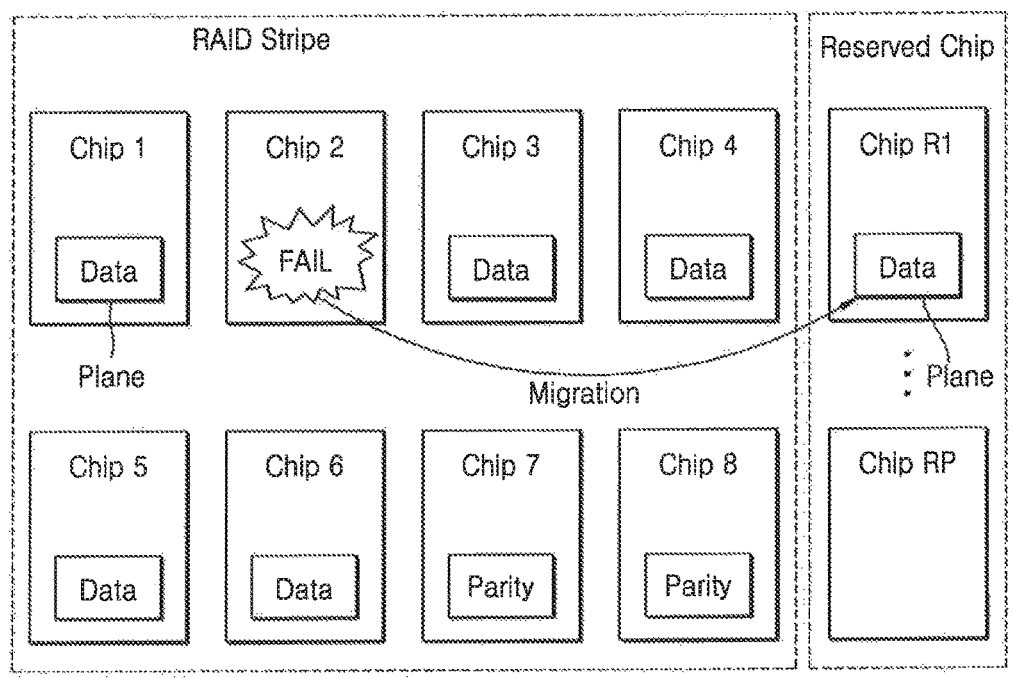
Figure 7B:
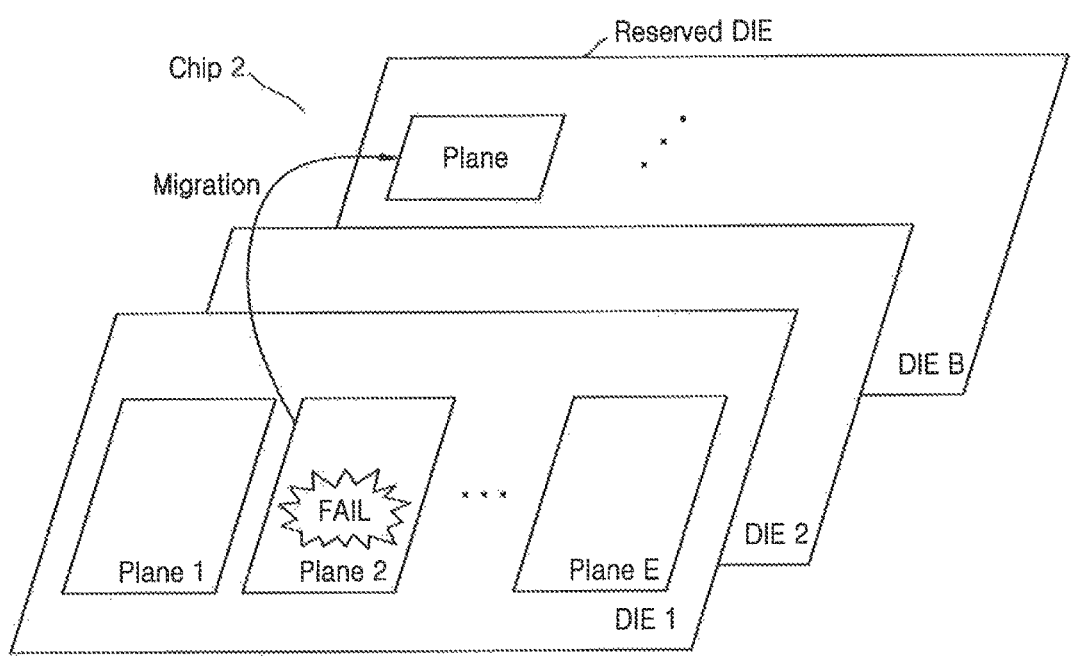
Figure 7C:
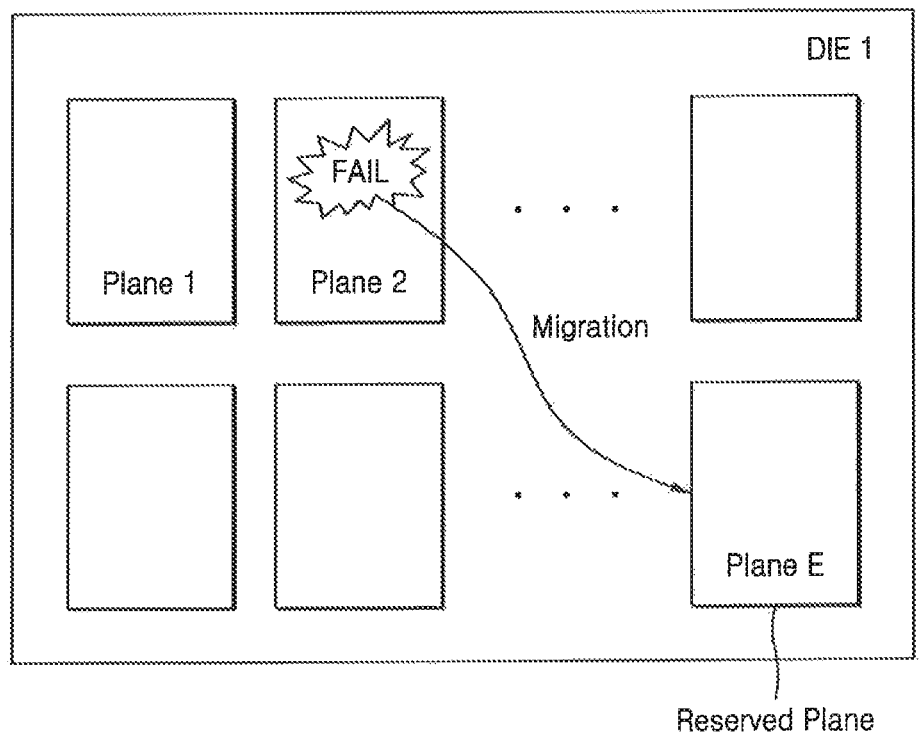

FIGS. 7A, 7B, and 7C illustrate an example of data migration in units of planes. In the example of FIGS. 7A, 7B, and 7C, the above-described cell region may correspond to a plane. When the exemplary embodiments of FIGS. 7A, 7B, and 7C are described below, repeat descriptions of the same or similar operations with respect to the above-described exemplary embodiments will be omitted.

Referring to FIG. 7A, each of the first through eighth memory chips Chip 1 through Chip 8 may include a plurality of planes, and the data and RAID parity that constitute the RAID stripe may be distributed and stored in the planes of the first through eighth memory chips Chip 1 through Chip 8. For illustrative purposes, it is assumed that a plane of the second memory chip Chip 2 has failed.

Similar to the above-described exemplary embodiments, RAID recovery may be performed in units of planes by using the data and RAID parity that constitute the RAID stripe. The data of the plurality of pages of the plane of the second memory chip Chip 2 may be recovered via RAID recovery and may migrate to at least one plane of a reserved memory chip. For example, FIG. 7A illustrates an example in which the data of the plane of the recovered second memory chip Chip 2 migrates to a plane of the first reserved memory chip Chip R1.

FIG. 7B illustrates an example in which data migration is performed in units of planes when no reserved memory chips are included in the memory system, according to an exemplary embodiment of the inventive concept. For example, each of the first through eighth memory chips Chip 1 through Chip 8 includes B dies DIE 1 through DIE B, and the B-th die DIE B is used as the reserved cell region (or reserved die). For convenience of explanation, FIG. 7B illustrates only that a plane in the second memory chip Chip 2 has failed.

Referring to FIG. 7B, each of the dies DIE1 to DIE B may include a plurality of planes. For example, the first die DIE 1 includes first to E-th planes Plane 1 to Plane E. It is assumed here that a failure occurs in the second plane Plane 2 in the first die DIE 1 of the second memory chip Chip 2 that stores data that constitutes the RAID stripe. According to the above-described exemplary embodiments, as RAID recovery is performed in units of planes, the data of the second plane Plane 2 of the second memory chip Chip 2 may be recovered. The recovered data may migrate to at least one reserved cell region (for example, at least one reserved die). For example, as shown in FIG. 7B, the recovered data may migrate to a plane within the reserved die DIE B of the second memory chip Chip 2.

FIG. 7C illustrates an example in which data migration is performed in units of planes when neither reserved memory chips nor reserved dies are included in the memory system, according to an exemplary embodiment of the inventive concept. For example, each of the first through eighth memory chips Chip 1 through Chip 8 includes the B dies each including a plurality of planes, and at least one of the planes is used as the reserved cell region (or reserved plane). For convenience of explanation, FIG. 7C illustrates that only a plane of the first die DIE1 of one memory chip has failed.

The data of the failed plane (for example, the second plane Plane 2) may be recovered via RAID recovery according to the above-described exemplary embodiments. The data of the recovered second plane Plane 2 may migrate to at least one of the other planes of the same die to which the recovered second plane Plane 2 also belongs, where the at least one plane is used as a reserved plane. For example, as shown in FIG. 7C, when the second plane Plane 2 of the first die DIE 1 has failed, the data of the recovered second plane Plane 2 may migrate to another plane within the first die DIE 1 that is used as a reserved plane (e.g., the E-th plane Plane E).

Although in FIG. 7C, the data of the failed plane (e.g., the second plane Plane 2) migrates to a reserved plane within the same memory chip and the same die to which the failed plane belongs, the inventive concept is not limited thereto. For example, the data of the recovered plane Plane 2 may migrate to a reserved plane of another die. Alternatively, the data of the recovered plane Plane 2 may migrate to a plane included in another memory chip.

When the memory system includes at least one reserved cell region and data recovered via RAID recovery migrates to the reserved cell region, according to the above-described exemplary embodiment, a ratio of RAID parity to data in the RAID stripe may be maintained. For example, as the ratio of the RAID parity to data increases, an error correction capability may increase. As in the above-described exemplary embodiment, the ratio of the RAID parity to data is maintained according to data migration using the reserved cell region, thus preventing a reduction in the error correction capability.

Figure 8A:
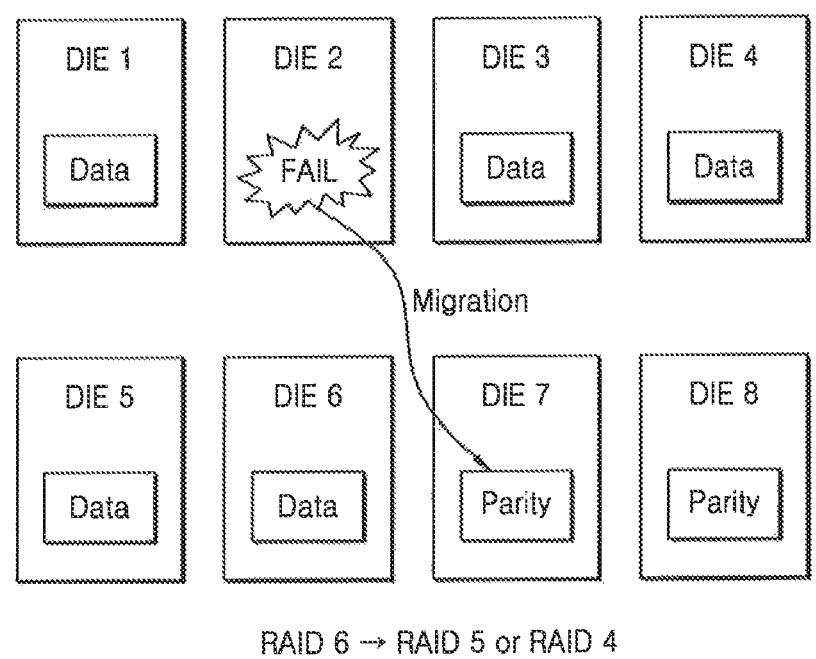
FIGS. 8A, 8B, and 9 are block diagrams illustrating examples of data migration when a memory system includes no reserved cell regions according to exemplary embodiments of the inventive concept.
Figure 8B:
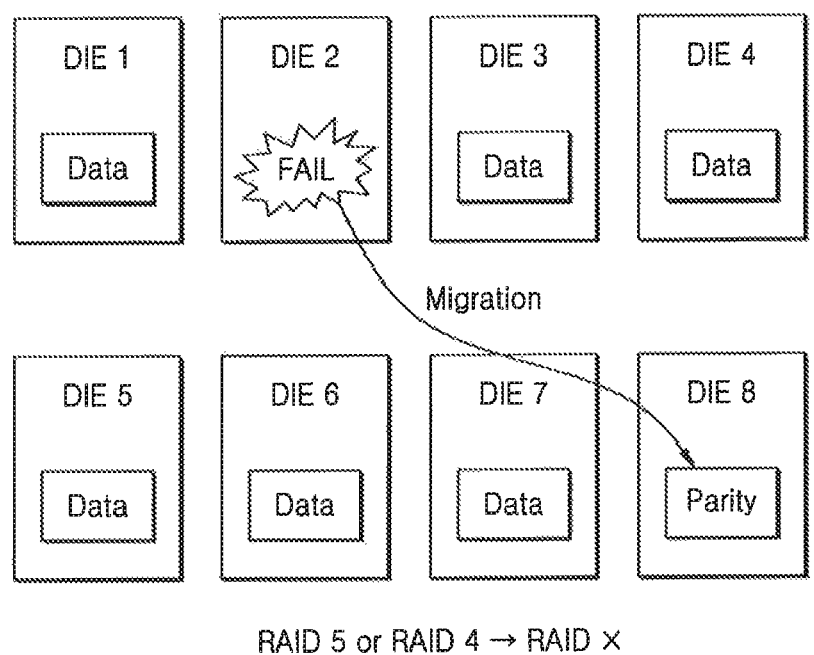
Figure 9:
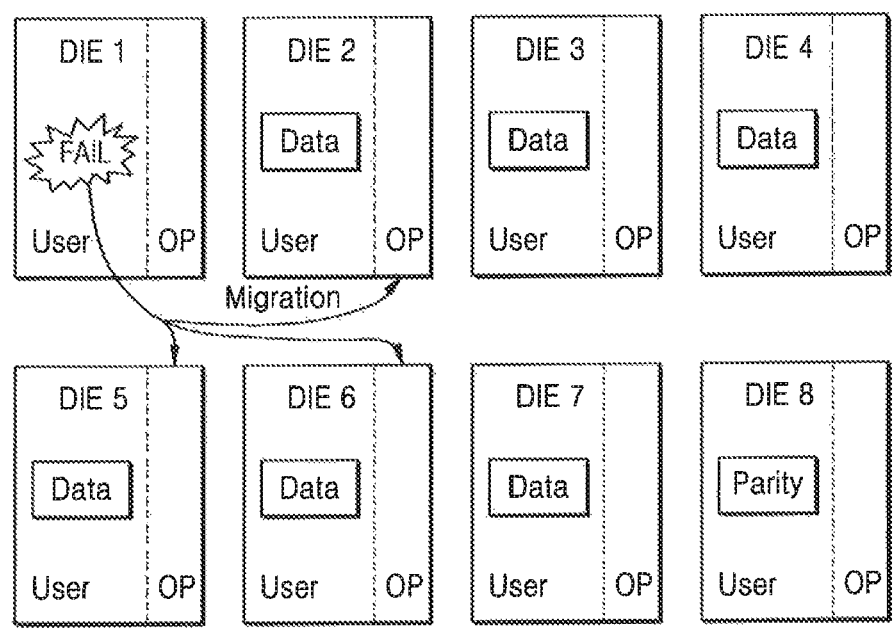

FIGS. 8A, 8B, and 9 are block diagrams illustrating examples of data migration when the memory system includes no reserved cell regions, according to exemplary embodiments of the inventive concept. In the exemplary embodiments below, RAID recovery and RAID migration in units of dies will be described, for convenience of explanation. However, the inventive concept is not limited thereto. For example, according to the above-described exemplary embodiments, the RAID recovery and RAID migration may be performed in units of memory chips or planes.

Referring to FIG. 8A, the data and RAID parity that constitute the RAID stripe may be distributed and stored in a plurality of dies (e.g., the first through eighth dies DIE 1 through DIE 8). For example, the data may be stored in the first through sixth dies DIE 1 through DIE 6, and the RAID parity may be stored in the seventh and eighth dies DIE 7 and DIE 8. Assuming that the second die DIE 2 has failed, the data of the plurality of pages of the second die DIE 2 may be recovered via the RAID recovery according to the above-described exemplary embodiments. As one RAID stripe includes two RAID parities, the level of RAID applied to FIG. 8A may correspond to RAID 6.

The data of the recovered second die DIE 2 may migrate to at least one of the remaining dies. For example, the data of the recovered second die DIE 2 may migrate to one die (for example, the seventh die DIE 7) that stores RAID parity, and the RAID parity previously stored in the seventh die DIE 7 may be removed from the RAID stripe.

According to this migration, the RAID stripe may include the data stored in the first die DIE 1 and third through seventh dies DIE 3 through DIE 7, and the RAID parity stored in the eighth die DIE 8. In other words, as the one RAID stripe now includes one RAID parity, the level of the RAID applied to FIG. 8A may be changed from RAID 6 to RAID 4 or RAID 5.

FIG. 8B illustrates an example in which a previous RAID stripe includes one RAID parity according to an exemplary embodiment of the inventive concept. Referring to FIG. 8B, the first through seventh dies DIE 1 through DIE 7, among the first through eighth dies DIE 1 through DIE 8, may store data, and the eighth die DIE 8 may store the RAID parity. The level of the RAID applied to FIG. 8B may correspond to RAID 5 or RAID 4.

The data of a failed second die DIE 2 may be recovered via RAID recovery, and the data of the recovered second die DIE 2 may migrate to the eighth die DIE 8 that stores the RAID parity. Accordingly, the RAID parity previously stored in the eighth die DIE 8 may be removed from the RAID stripe. In other words, the RAID parity is removed from the RAID stripe due to the data migration, according to an exemplary embodiment of the inventive concept, and thus, RAID application may be cancelled.

According to the above-described exemplary embodiment, when the recovered data migrates to a cell region that stores the RAID parity, the recovered data may migrate to a cell region that has not failed while maintaining the capacity of a previously-used storage space.

FIG. 9 illustrates an example in which data recovered via RAID recovery is stored in an over-provisioning region OP according to an exemplary embodiment of the inventive concept.

Referring to FIG. 9, each die may include a user region User that stores actual user data, and the over-provisioning region OP that is additionally provided at a certain ratio. The over-provisioning region OP may be used in various types of memory operations. For example, when an operation such as garbage collection is performed, the over-provisioning region OP may be used to temporarily store valid data.

Data and RAID parity that constitute the RAID stripe are distributed and stored in a plurality of dies (e.g., the first through eighth dies DIE 1 through DIE 8). For example, the data and the RAID parity may be stored in the user regions User of the dies. Assuming that the first die DIE 1 has failed, the data of the plurality of pages of the first die DIE 1 may be recovered via the RAID recovery according to the above-described exemplary embodiments.

According to an exemplary embodiment of the inventive concept, the data of the recovered first die DIE 1 may migrate to the over-provisioning region OP of at least one of the remaining dies. For example, FIG. 9 illustrates an example in which the data of the recovered first die DIE 1 migrates to the second, fifth, and sixth dies DIE 2, DIE 5, and DIE 6.

According to the exemplary embodiment of FIG. 9, storage space of the memory system may be more efficiently utilized because no special reserved cell regions are used, and a RAID level may be maintained because the RAID parity is not removed, thus, securing the stability of data.

Figure 10:
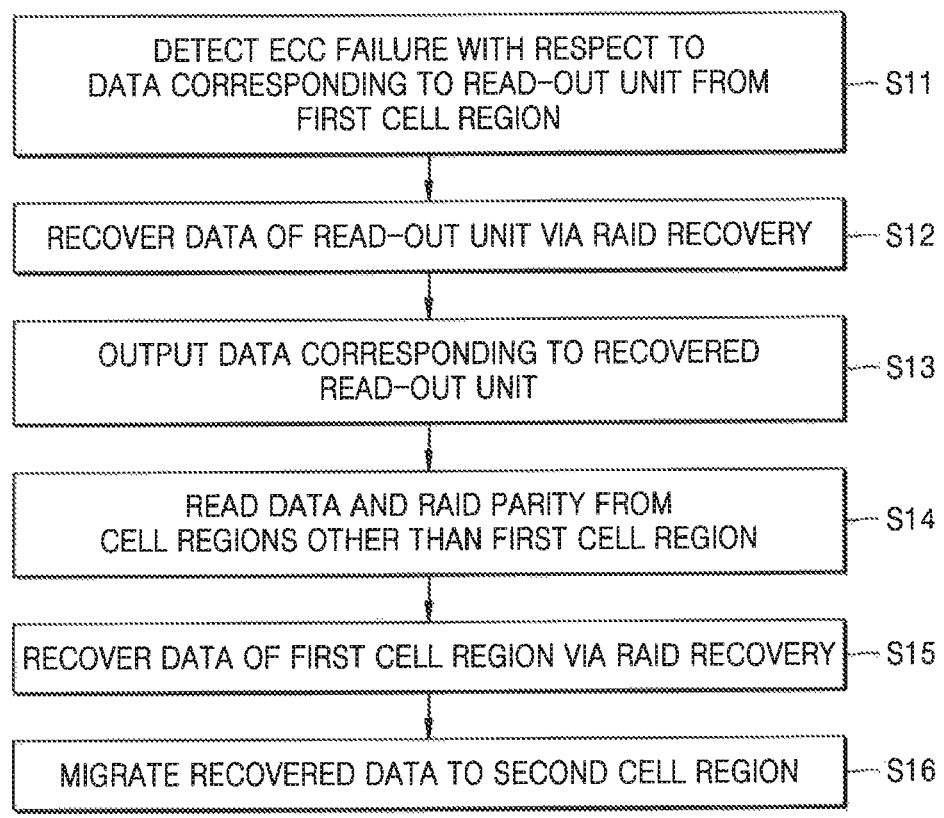
FIG. 10 is a flowchart of a method of operating a memory system, according to an exemplary embodiment of the inventive concept.

FIG. 10 is a flowchart of a method of operating a memory system, according to an exemplary embodiment of the inventive concept.

Referring to FIG. 10, the memory system may include a plurality of cell regions. Each cell region may be defined variously according to the above-described exemplary embodiments. For example, the cell region may have a larger size than the write or read-out unit because the cell region includes a plurality of pages. According to an exemplary embodiment of the inventive concept, when the memory system includes at least one flash memory chip, the cell region may correspond to a memory chip, a die, or a plane. It is assumed here that the unit in which the memory system writes or reads data at the request of the host is a page.

When a read-out request for a page included in the first cell region is received from the host, the memory system reads the data that is requested to be read and the ECC parity corresponding to the data, and performs an error correction operation using the ECC parity. According to an exemplary embodiment of the inventive concept, the data and the ECC parity may be read from the first cell region together. If the first cell region has failed, an ECC failure with respect to data corresponding to the read-out unit is detected (operation S11).

As the ECC failure is detected, the data and RAID parity that constitute the RAID stripe may be read from cell regions other than the first cell region, and the data of the read-out unit may be recovered via RAID recovery using the read data and the read RAID parity (operation S12). The data corresponding to the recovered read-out unit may be output to the host in response to the read-out request from the host (operation S13).

Thereafter, the RAID recovery in units of cell regions may be performed, and recovered data corresponding to the first cell region may migrate to another cell region that has not failed (for example, a second cell region). For example, the data and RAID parity that of the RAID stripe may be read from cell regions other than the first cell region (operation S14). The data of the first cell region may be recovered via RAID recovery based on the read-out data and the read-out RAID parity (operation S15). The recovered data may migrate to the second cell region (operation S16). According to an exemplary embodiment of the inventive concept, the first cell region may include a plurality of pages, the plurality of pages may sequentially undergo RAID recovery, and data recovered in units of pages may sequentially migrate to the second cell region.

According to an exemplary embodiment of the inventive concept, the memory system may detect whether cell regions failed, periodically or non-periodically, regardless of a write or read-out request from the host. According to an exemplary embodiment of the inventive concept, when the memory system includes reserved cell regions, the second cell region may correspond to at least one reserved cell region. Alternatively, when reserved cell regions are all in use or the memory system includes no reserved cell regions, a cell region that stores the RAID parity may be used as the second cell region.

Alternatively, similar to the above-described exemplary embodiment of FIG. 9, each cell region may include the user region and the OP region, and the data of the recovered first cell region may migrate to the OP region of at least one of the remaining cell regions.

Figure 11A:
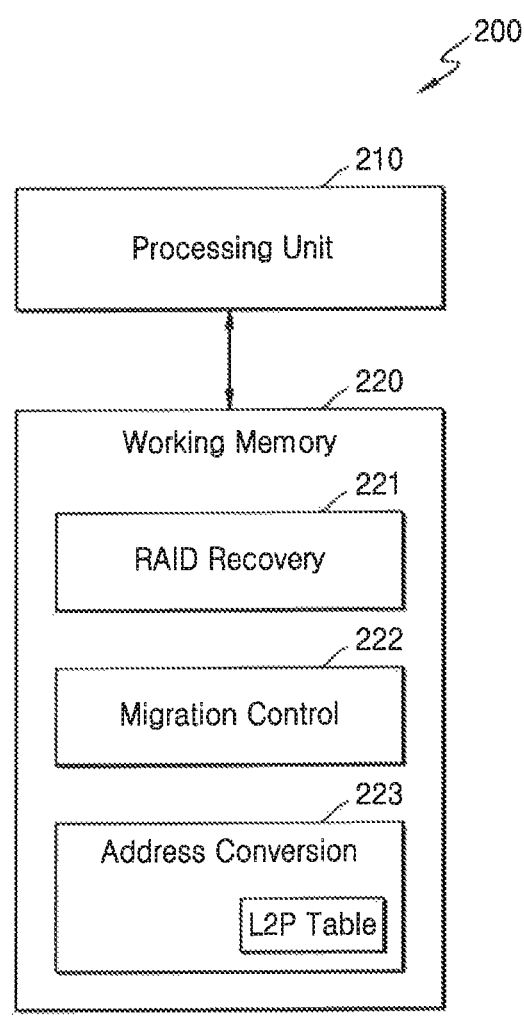

FIGS. 11A and 11B are block diagrams of a memory system 200 that illustrate an example in which data migration is performed according to a software method, according to an exemplary embodiment of the inventive concept.

Referring to FIG. 11A, the memory system 200 may include a processing unit 210 and a working memory 220.

RAID recovery and data migration according to exemplary embodiments of the inventive concept may be performed by executing software loaded in the working memory 220. The software may be stored in a storage means (for example, a nonvolatile storage means) within the memory system 200 and loaded in the working memory 220. According to an exemplary embodiment of the inventive concept, the working memory 220 may be implemented using volatile memory or nonvolatile memory, which is a computer-readable recording medium. For example, the working memory 220 may be implemented using random access memory (RAM), read-only memory (ROM), Electronically Erasable Programmable Read Only Memory (EEPROM), flash memory, or other memory.

The software stored in the working memory 220 may be classified into a plurality of modules according to its function. For example, the software stored in the working memory 220 may include a program corresponding to a RAID recovery module 221, a program corresponding to a migration control module 222, and a program corresponding to an address conversion module 223. The address conversion module 223 may include a logical-to-physical (L2P) table having conversion information between a logical address and a physical address.

The processing unit 210 may perform the RAID recovery operations according to the above-described exemplary embodiments by executing the RAID recovery module 221. For example, the RAID recovery module 221 may recover the data of a failed cell region by performing a calculation based on the data and RAID parity that constitute the RAID stripe. The processing unit 210 may control the recovered data migration operations according to the above-described exemplary embodiments by executing the migration control module 222. For example, the processing unit 210 may determine a cell region to which the recovered data is to migrate (for example, a target cell region), and may control the data migration in units of memory chips, dies, or planes according to the above-described exemplary embodiments based on a result of the determination.

According to an exemplary embodiment of the inventive concept, the above-described RAID recovery and data migration may be performed in various modes. For example, the RAID recovery and data migration may be performed in a burst mode of preferentially migrating recovered data to the target cell region without processing an input and output (IO) request from the host. Alternatively, the RAID recovery and data migration may be performed in a background mode of migrating recovered data to the target cell region in the background while processing an IO request from the host.

The processing unit 210 may convert a logical address of data requested by the host into a physical address representing a physical storage location of the memory system 200 by executing the address conversion module 223. Since data recovered via RAID recovery migrates to another cell region according to the above-described exemplary embodiments of the inventive concept, mapping information between the logical address and physical address related to the recovered data may change. Mapping information based on a result of the migration of the recovered data may be updated in the L2P table.

FIG. 11B illustrates various examples of a change in mapping information according to a migration result of recovered data according to an exemplary embodiment of the inventive concept. In FIG. 11B, the recovered data migrates to the reserved cell region.

Referring to table (a) of FIG. 11B, the RAID recovery may be performed in units of dies, and the data of a recovered die may migrate to a reserved die. For example, when an A-th die DIE A has failed, the data of the A-th die DIE A may be recovered via RAID recovery, and the recovered data may migrate to a first reserved die DIE R1. A logical address DIE_ADD_L1 for indicating the A-th die DIE A had been previously mapped to a physical address DIE_ADD_P1 indicating a physical location of the A-th die DIE A. However, due to the migration of the recovered data, the mapping information may be changed such that the logical address DIE_ADD_L1 may be mapped to a physical address DIE_ADD_PR1 representing a physical location of the first reserved die DIE_R1.

Even when an address exists in units of cell regions as described above, the mapping information may be changed in units of cell regions, as shown in FIG. 11B. According to an exemplary embodiment of the inventive concept, the mapping information may be changed in units of pages due to the migration of recovered data.

For example, referring to table (b) of FIG. 11B, the RAID recovery may be performed in units of planes, and the data of a recovered plane may migrate to a reserved plane. For example, the data of the recovered first plane Plane 1 may migrate to the first reserved plane Plane R1. Each plane may include D pages.

As the data of the recovered first plane Plane 1 migrates, the mapping information indicating the pages of the first plane Plane 1 may be changed. For example, before the mapping information is changed, logical addresses Page_ADD_L1 through Page_ADD_LD, for indicating the pages of the first plane Plane 1, have been mapped to physical addresses Page_ADD_P1 through Page_ADD_PD, indicating physical locations of the first plane Plane 1. However, due to the migration of the recovered data, the mapping information may be changed such that the logical addresses Page_ADD_L1 through Page_ADD_LD may be mapped to physical addresses Page_ADD_PR1 through Page_ADD_PRD, indicating physical locations of the first reserved plane Plane R1.

Figure 12:
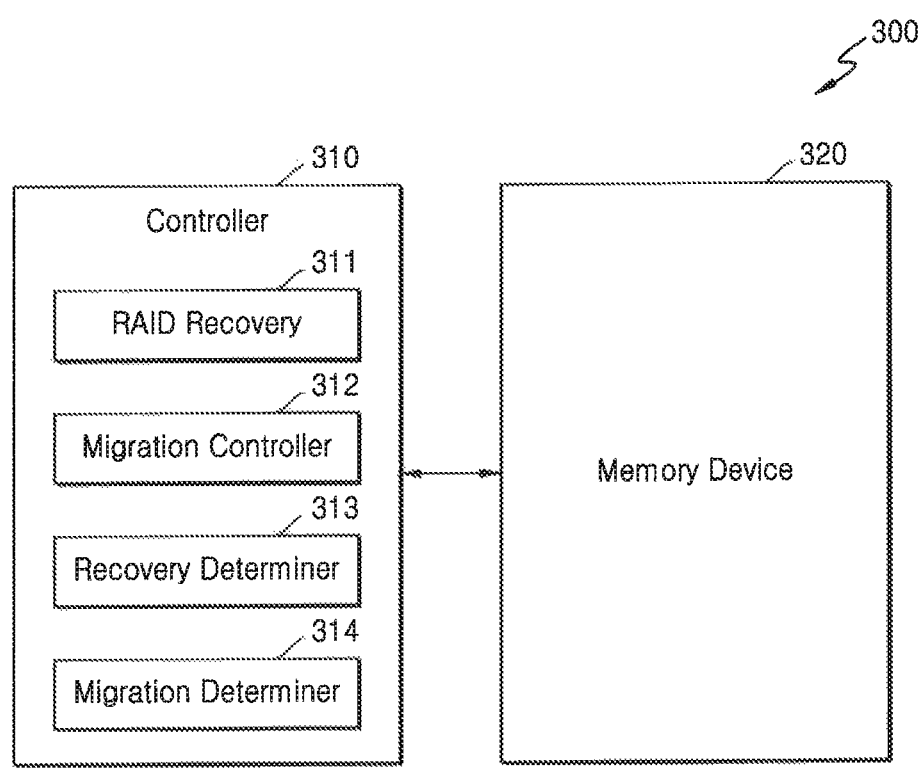
FIG. 12 is a block diagram of a memory system according to an exemplary embodiment of the inventive concept.

FIG. 12 is a block diagram of a memory system 300 according to an exemplary embodiment of the inventive concept. When a structure and operation of the memory system 300 are described below, the same or similar elements as those previously described with respect to the exemplary embodiment of FIG. 1 will not be described again.

Referring to FIG. 12, the memory system 300 may include a controller 310 and a memory device 320. The controller 310 may include a RAID recovery circuit 311, a migration controller 312, a recovery determiner 313, and a migration determiner 314. Although the components included in the controller 310 are hardware components in FIG. 12, the inventive concept is not limited thereto. For example, RAID recovery, migration control, recovery determination, and migration determination may be performed using software. In this case, the controller 310 may include a working memory that stores programs for performing these functions, and a processing unit capable of executing the working memory.

The RAID recovery circuit 311 may perform the RAID recovery by using the data and RAID parity that constitute the RAID stripe according to the above-described exemplary embodiments of the inventive concept, and may recover the data of a failed cell region. The migration controller 312 may control an operation of migrating recovered data to another cell region. For example, the migration controller 312 may perform an operation of selecting a reserved cell region, a cell region for storing RAID parity, or an OP region as a cell region to which data is to migrate (for example, a target cell region). As described above, RAID recovery and/or data migration may be performed in a burst mode or in a background mode.

The recovery determiner 313 may determine whether to execute the RAID recovery. For example, the RAID recovery according to exemplary embodiments of the inventive concept may be performed in units of cell regions each including a plurality of pages, and migration of the recovered data may also be performed in units of cell regions. Accordingly, the recovery determiner 313 may determine whether to execute the RAID recovery based on whether a cell region has failed.

The migration determiner 314 may determine the timings to perform data recovery and data migration. For example, since data recovery and data migration are performed in units of cell regions each including a plurality of pages, a relatively large amount of time may be taken to perform the data recovery and data migration. Accordingly, the migration determiner 314 may determine an operational state and the like of the memory system 300, and may determine whether to perform the data migration based on a result of this determination. According to an exemplary embodiment of the inventive concept, the migration determiner 314 may check commands stored in the memory system 300 to perform a plurality of requests from the host, and may determine a timing suitable to execute the data migration based on a result of the checking. Alternatively, the memory system 300 may perform the data recovery and data migration under the control of the host, and the migration determiner 314 may determine a timing to execute the data migration based on a request from the host.

Figure 13:
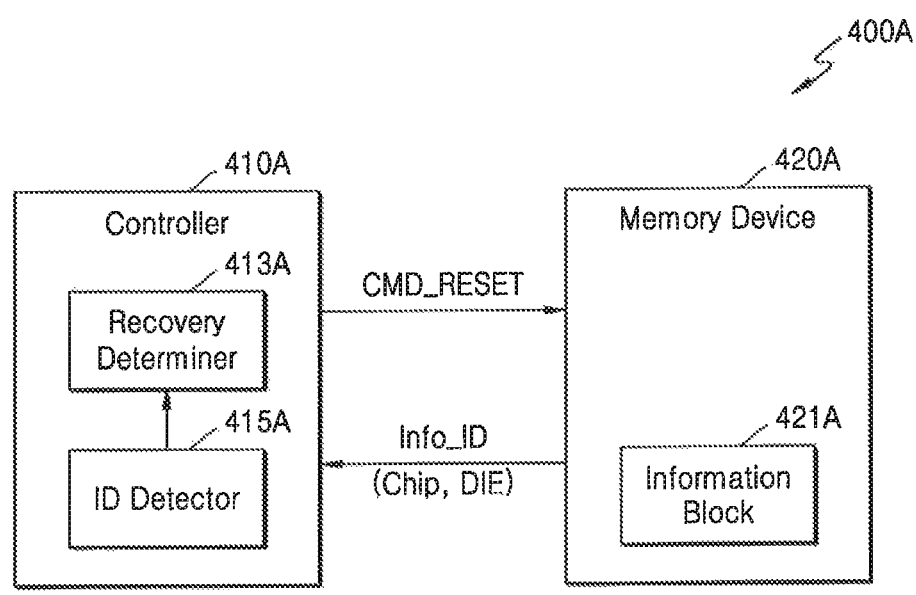
FIGS. 13 and 14 are block diagrams illustrating determination of a cell region on which RAID recovery is to be performed according to an exemplary embodiment of the inventive concept.
Figure 14:
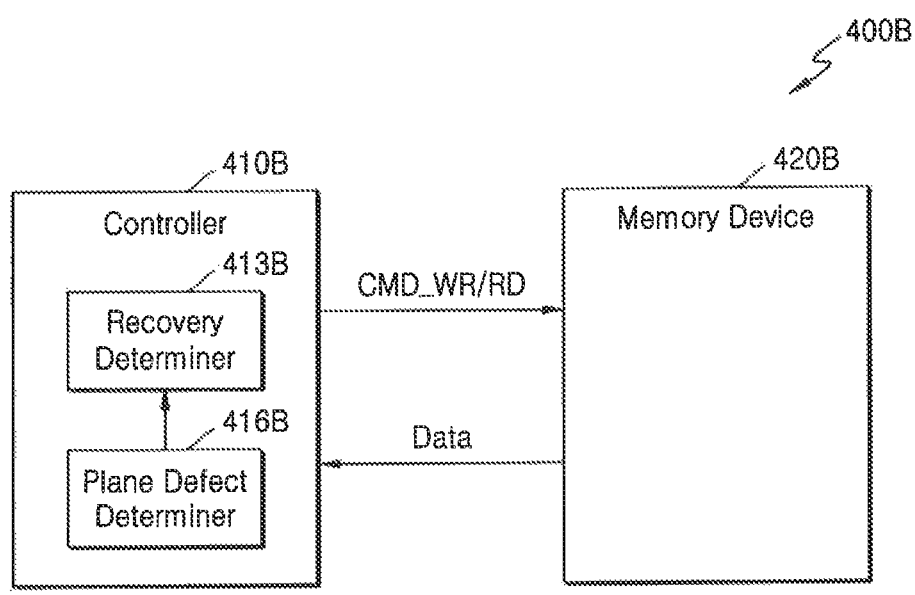

FIGS. 13 and 14 are block diagrams illustrating determination of a cell region on which RAID recovery is to be performed according to an exemplary embodiment of the inventive concept.

Referring to FIG. 13, a memory system 400A may include a controller 410A and a memory device 420A. The controller 410A may include a recovery determiner 413A and an identity (ID) detector 415A. The memory device 420A may include an information block 421A that stores ID information Info ID of each of a plurality of memory chips or a plurality of dies DIE included in the memory device 420A. An example of determining whether to execute RAID recovery in units of dies will now be described.

According to an exemplary embodiment of the inventive concept, the memory system 400A may detect whether each of the plurality of dies DIE included in the memory device 420A has failed, via a predetermined test process. For example, to detect whether each of the plurality of dies DIE has failed, the controller 410A may output a reset command CMD_RESET to the memory device 420A, and the memory device 420A may perform a reset operation in response to the reset command CMD_RESET. During the reset operation, the memory device 420A may read the ID information Info_ID of each of the dies DIE stored in the information block 421A and provide the read-out ID information Info_ID to the controller 410A.

The ID detector 415A may detect whether the ID information Info_ID has been appropriately read from and provided by the memory device 420A. For example, according to whether each of the dies DIE has failed, the ID information Info_ID may not be properly read from a failed die DIE, and the ID detector 415A may provide a result of the detection of the ID information Info_ID to the recovery determiner 413A. The recovery determiner 413A may determine a die on which RAID recovery is to be performed in units of cell regions, based on the result of the detection.

FIG. 14 illustrates an example of determining whether to perform RAID recovery based on a result of a memory operation with respect to a plane according to an exemplary embodiment of the inventive concept.

Referring to FIG. 14, a memory system 400B may include a controller 410B and a memory device 420B. The controller 410B may include a recovery determiner 413B and a plane defect determiner 416B.

The controller 410B may request execution of memory operations, such as a write operation and a read operation, of a plurality of cell blocks included in the memory device 420B, and may determine whether the memory operations have been properly performed, based on a response of the memory device 420B. For example, an address indicating a specific plane together with a write/read command CMD_WR/RD for the specific plane may be provided to the memory device 420B, and the memory device 420B may provide a response (e.g., data read from the specific plane) to the controller 410B.

The plane defect determiner 416B may determine the degree of a defect generated in the plane based on the response from the memory device 420B. For example, the controller 410B may perform error detection of data as an error correction unit by using an ECC circuit or the like, and the plane defect determiner 416B may receive a result of the error correction and determine the degree of the defect generated in the plane. For example, the number of pages having an ECC failure may be determined from one plane. The recovery determiner 413B may determine a plane on which RAID recovery is to be performed in units of pages, based on a result of the determination by the plane defect determiner 416B.

Figure 15:
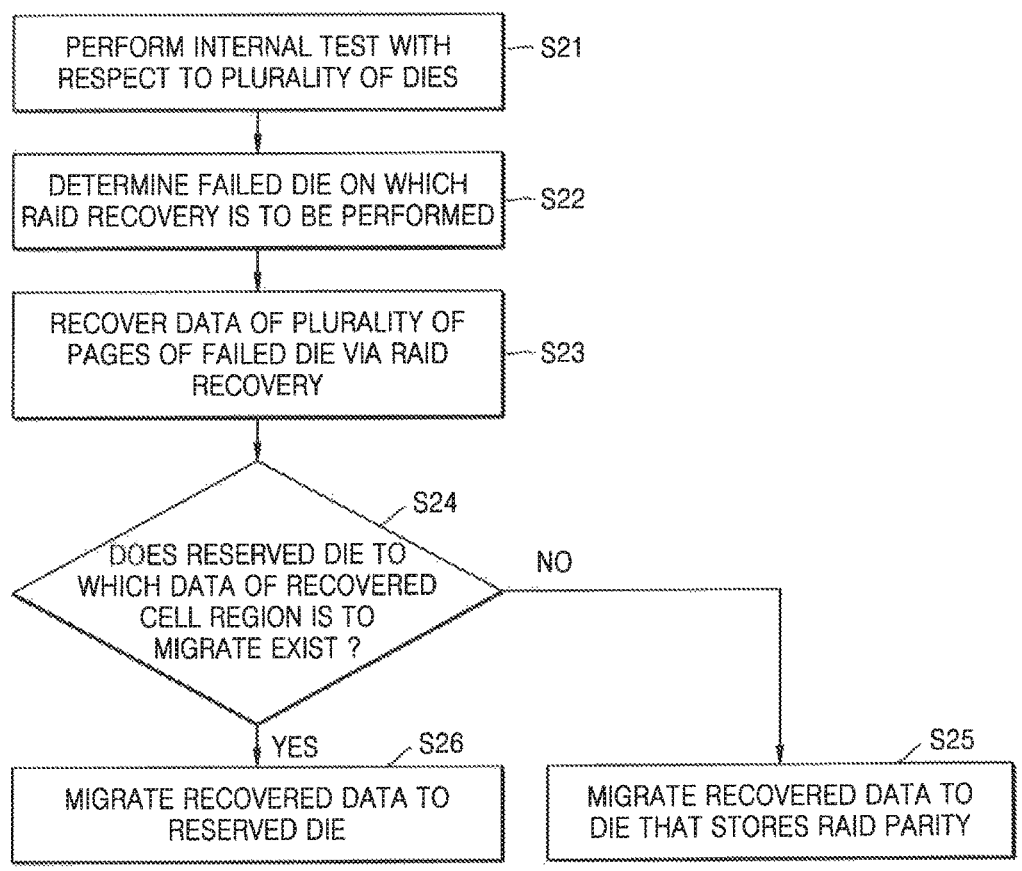
FIGS. 15-17 are flowcharts of methods of operating a memory system, according to exemplary embodiments of the inventive concept.
Figure 16:
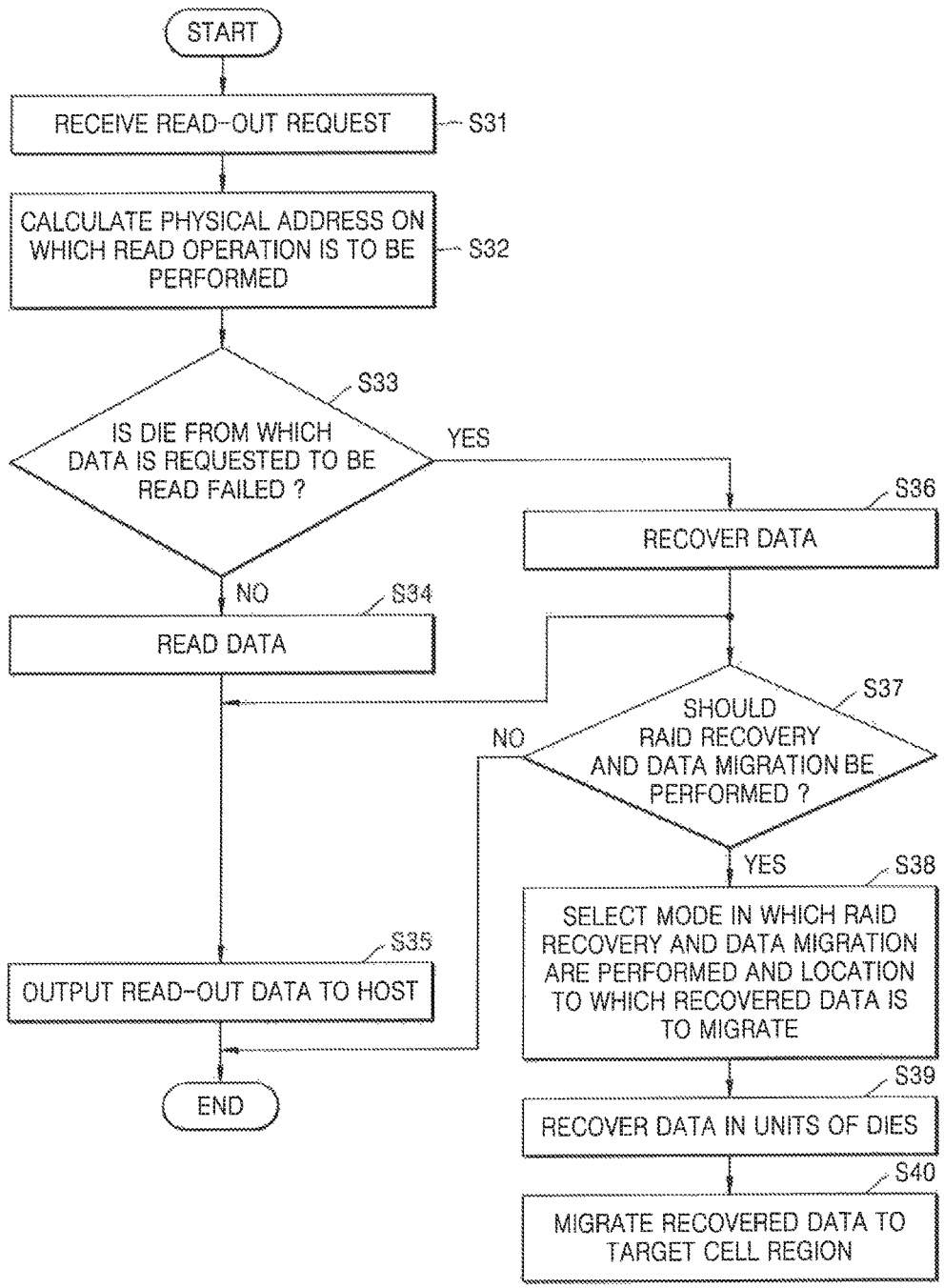
Figure 17:
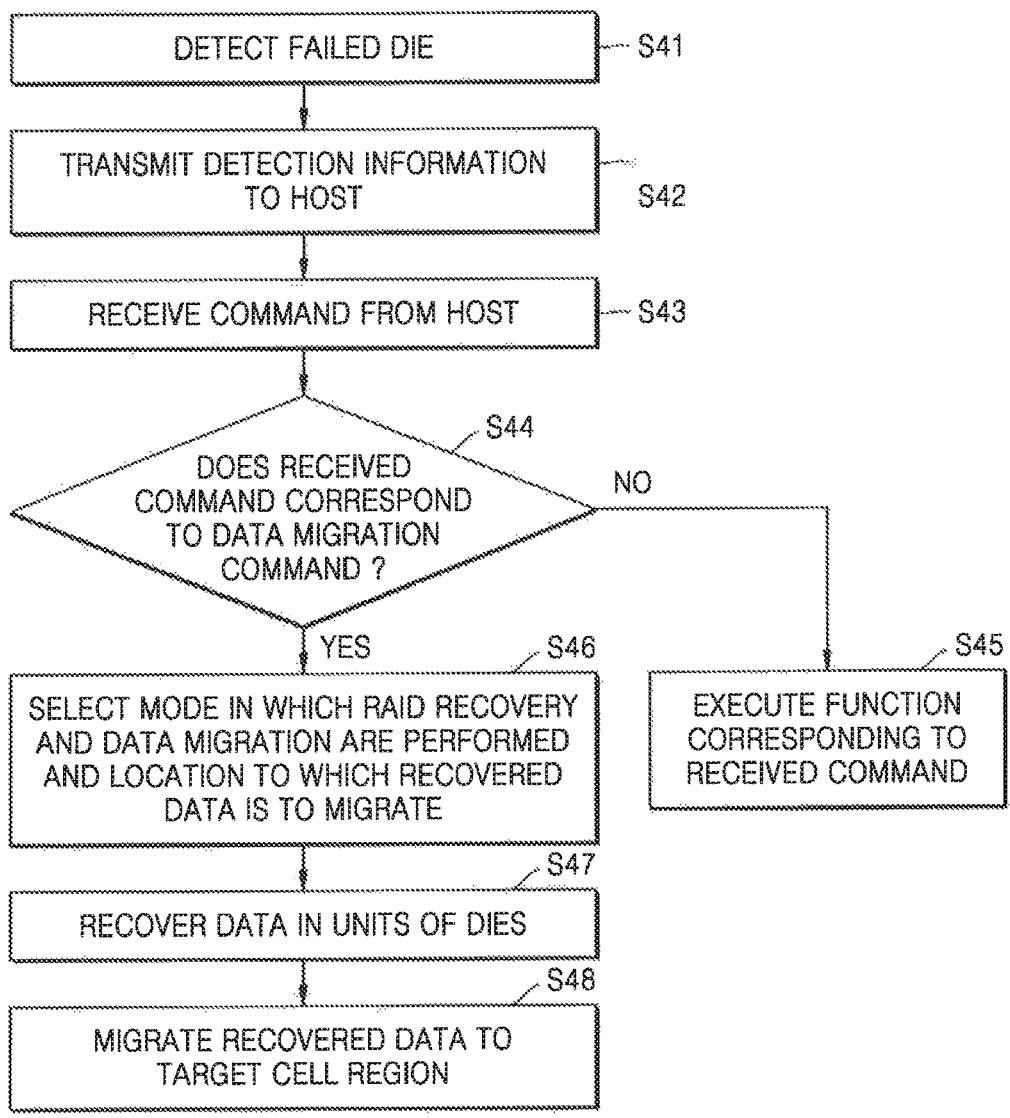

FIGS. 15-17 are flowcharts of methods of operating a memory system, according to exemplary embodiments of the inventive concept. FIGS. 15-17 illustrate RAID recovery and data migration in units of dies. However, as in the above-described exemplary embodiments, the unit in which the RAID recovery and data migration are performed may be various units other than a die.

Referring to FIG. 15, an internal test with respect to a plurality of dies included in the memory system is performed (operation S21). According to an exemplary embodiment of the inventive concept, it may be determined whether each of the dies has failed, based on a result of reading ID information from each of the dies. In operation S22, a failed die on which RAID recovery is to be performed may be determined according to a result of the internal test.

In operation S23, the RAID recovery is performed in units of dies according to the above-described exemplary embodiments of the inventive concept, and the data of the plurality of pages of the failed die are recovered. The recovered data may migrate to at least one die having no failures. According to an exemplary embodiment of the inventive concept, the memory system may include at least one reserved die, and it is determined whether a reserved die, to which the data of the recovered cell region is to migrate, exists (operation S24). When it is determined, in operation S24, that the memory system includes no reserved dies or all of the reserved dies are in use (for example, when valid data is stored in all of the reserved dies), the recovered data may migrate to a die that stores the RAID parity (operation S25). On the other hand, when an available reserved die exists, the recovered data may migrate to the reserved die (operation S26).

Referring to FIG. 16, the RAID recovery and data migration may be triggered according to various methods. For example, a memory system receives a read-out request from a host in operation S31. In operation S32, a physical address on which a read operation is to be performed may be calculated using mapping information and a logical address provided by the host. When the physical address is calculated, a cell region (for example, a die), including a page corresponding to the physical address, may be determined.

In operation S33, it may be determined whether the die, from which data is requested to be read, is a failed die that requires RAID recovery. Operation S33 may be performed using various methods. For example, information of the failed die may be previously stored based on an internal test during an initial operation of the memory system as in the above-described exemplary embodiment of FIG. 15, and the failed die may maintain an unrecovered state (e.g., no RAID recovery is performed). Thereafter, when it is determined that a request from the host corresponds to the failed die, the failed die may undergo RAID recovery.

Alternatively, according to an exemplary embodiment of the inventive concept, when it is impossible to perform error correction based on ECC parity with respect to a page from which data is requested to be read, a die including this page may be determined to be the failed die. Alternatively, when read-out requests for a plurality of pages of a predetermined die are received in series and error correction based on ECC parity with respect to the plurality of pages is impossible, the predetermined die may be determined as the failed die.

When the die from which data is requested to be read is not a failed die, the memory system may read data at the request of the host (operation S34), and may output the read-out data to the host (operation S35). On the other hand, when the die from which data is requested to be read is a failed die, the data of the page, from which data is requested to be read, may be recovered using the data and RAID parity of the RAID stripe (operation S36), and the recovered data may be output to the host (operation S35).

Additionally, if the die is determined to be a failed die, in operation S37, it may be determined whether to perform the RAID recovery and data migration on the failed die in units of dies. According to the above-described exemplary embodiments of the inventive concept, whether to execute the data migration may be determined according to various methods. According to the present exemplary embodiment, the memory system determines whether to execute data migration. According to an exemplary embodiment of the inventive concept, the memory system may determine a work load according to a request from the host, and perform the RAID recovery and data migration immediately or later based on a result of the determination.

When the RAID recovery and data migration are performed, a mode in which the RAID recovery and data migration are performed and a location to which recovered data is to migrate may be selected (operation S38). For example, as previously described, the RAID recovery and data migration may be performed in a burst mode or a background mode, and the data of the recovered die may migrate to a reserved die, a die that stores the RAID parity, or OP regions of other dies.

When the mode and the location are selected as described above, the data may be recovered via RAID recovery in units of dies (operation S39), and the recovered data may migrate to the target cell region (for example, a target die) (operation S40).

FIG. 17 illustrates an example in which data migration is triggered by a host according to an exemplary embodiment of the inventive concept.

Referring to FIG. 17, the memory system detects a failed die on which RAID recovery is to be performed in units of dies (operation S41), and detection information is transmitted to the host (operation S42). The detection information may include various pieces of information, for example, information of the failed die and time periods taken to perform the RAID recovery and data migration.

The host may determine a data migration time point based on the detection information including the various pieces of information, and may provide a data migration command to the memory system. In operation S43, the memory system receives a command from the host, and in operation S44, it is determined whether the received command corresponds to the data migration command. When the received command is not the data migration command, the memory system executes a function corresponding to the command received from the host, in operation S45.

On the other hand, when the command received from the host is the data migration command, the memory system may perform the RAID recovery and data migration on the failed die. For example, as in the above-described exemplary embodiment of FIG. 16, the mode in which RAID recovery and data migration are performed and the location to which recovered data is to migrate may be selected (operation S46), data may be recovered via RAID recovery in units of dies (operation S47), and the recovered data may migrate to the target cell region (for example, a target die) (operation S48).

Figure 18:
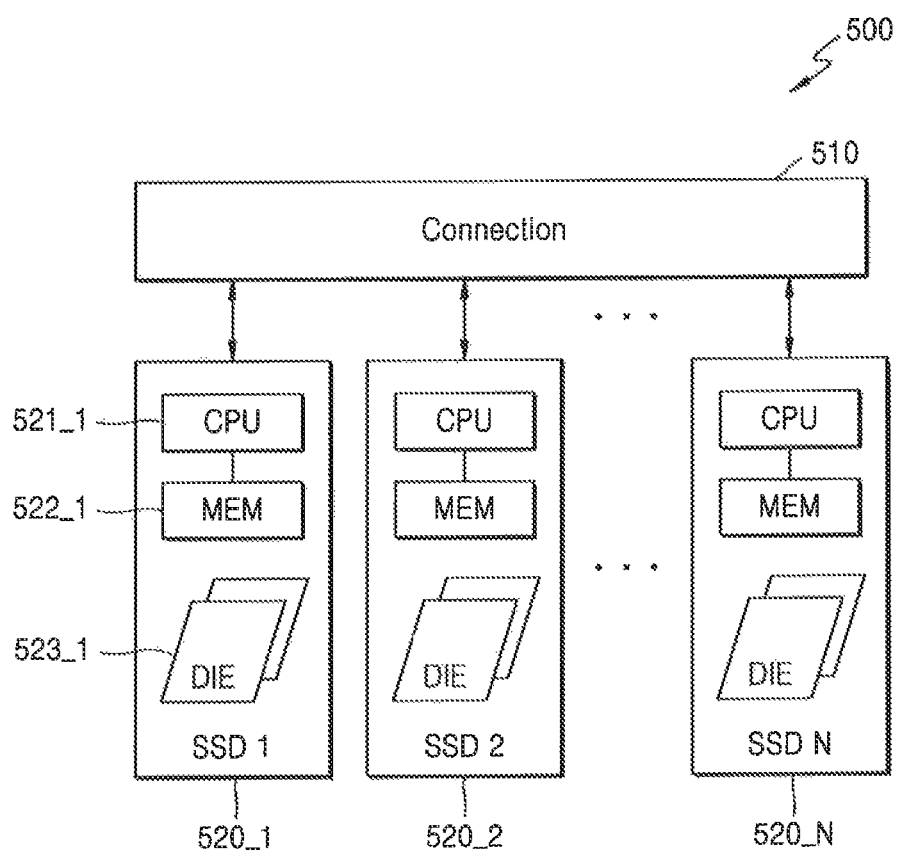
FIG. 18 is a block diagram of a computing system including a memory system, according to an exemplary embodiment of the inventive concept.

FIG. 18 is a block diagram of a computing system 500 including a memory system, according to an exemplary embodiment of the inventive concept.

Referring to FIG. 18, the computing system 500 may include SSDs 520_1 through 520_N as a plurality of storage media, and the SSDs 520_1 through 520_N may transmit or receive various pieces of information via a connection unit 510 or forward a request from the host to another SSD. In other words, the computing system 500 may provide a distributed computing function.

Each of the SSDs 520_1 through 520_N may correspond to the memory system according to the above-described exemplary embodiments of the inventive concept. Accordingly, each of the SSDs 520_1 through 520_N may include at least one memory chip as a storage space 523_1 and each memory chip may include at least one die. Data and RAID parity that constitute a RAID stripe, according to the above-described exemplary embodiments, may be distributed and stored in the SSDs 520_1 through 520_N. Each of the SSDs 520_1 through 520_N may include a central processing unit (CPU) 521_1 and a memory 522_1.

According to an exemplary embodiment of the inventive concept, as each of the SSDs 520_1 through 520_N performs the RAID recovery and data migration, according to the above-described exemplary embodiments, by executing software stored in the memory 522_1. If one die of the first SSD 520_1 fails, the first SSD 520_1 may receive data and RAID parity from the other SSDs via the connection unit 510 and may recover the data of the failed die by using the received data and RAID parity. When the recovered data migrates to the other SSDs, the first SSD 520_1 may migrate the recovered data to the other dies of the other SSDs via the connection unit 510.

While the inventive concept has been particularly shown and described with reference to exemplary embodiments thereof, it will be understood by those of ordinary skill in the art that various changes in form and details may be made thereto without departing from the spirit and scope of the present inventive concept as defined by the following claims.

What is claimed is:

1. A method of operating a memory system, the method comprising:
    detecting whether data from a first cell region has a failure by reading ID information of the first cell region,
    wherein the first cell region is determined to have the failure when the ID information is not properly read;
    recovering and outputting the data from the first cell region by performing Redundant Array of Inexpensive Disk (RAID) recovery by using data and RAID parity read from other cell regions;
    recovering a plurality of pieces of data stored in the first cell region by performing the RAID recovery using the data and RAID parity read from the other cell regions; and
    migrating the recovered plurality of pieces of data to a second cell region in units of cell regions.

2. The method of claim 1, wherein each of the first cell region, the second cell region, and the other cell regions is a memory chip.

3. The method of claim 1, wherein each of the first cell region, the second cell region, and the other cell regions is a die included in a memory chip.

4. The method of claim 1, wherein
    the memory system comprises a plurality of cell regions that store the data and RAID parity that constitute a RAID stripe, and at least one reserved cell region,
    the first cell region and the other cell regions are among the plurality of cell regions, and
    the second cell region is the at least one reserved cell region.

5. The method of claim 1, wherein
    the memory system comprises a plurality of cell regions that store the data and RAID parity that constitute a RAID stripe,
    the first cell region and the other cell regions are among the plurality of cell regions, and
    the second cell region is one among the plurality of cell regions that stores the RAID parity.

6. The method of claim 5, wherein when the recovered plurality pieces of data are migrated to the second cell region, the RAID parity stored in the second cell region is removed and a RAID level applied to the memory system is changed.

7. The method of claim 1, wherein
the memory system comprises a plurality of cell regions that store the data and RAID parity that constitute a RAID stripe,
the first cell region and the other cell regions are among the plurality of cell regions,
each of the plurality of cell regions comprises a user region and an over-provisioning region, and
the second cell region is an over-provisioning region of at least one cell region among the plurality of cell regions.

8. The method of claim 1, further comprising selecting a migration mode of the recovered plurality pieces of data,
wherein, according to a result of the selection, the memory system is operated in a burst mode or a background mode,
in the burst mode, the recovered plurality of pieces of data are migrated without processing an input and output (IO) request from the host, and
in the background mode, the recovered plurality of pieces of data are migrated in the background while processing the IO request from the host.

9. The method of claim 1, further comprising providing, to the host, information of the first cell region on which the RAID recovery is to be performed,
wherein the RAID recovery is performed in units of cell regions in response to a data migration request from the host.

10. A method of operating a memory system, the memory system comprising M data cell regions for storing data and N parity cell regions for storing parity corresponding to the data, wherein M is an integer greater than or equal to 2 and N is an integer greater than or equal to 1, the method comprising:
detecting a failure of a first data cell region among the M data cell regions by reading ID information of the first data cell region,
wherein the first data cell region is determined to have the failure when the ID information is not properly read;
recovering a plurality of pieces of data stored in the first data cell region via a recovery operation using data stored in other data cell regions among the M data cell regions and parity stored in the N parity cell regions; and
migrating the recovered plurality of pieces of data of the first data cell region to a first parity cell region among the N parity cell regions.

11. The method of claim 10, wherein the data stored in the M data cell regions and the parities stored in the N parity cell regions constitute at least one RAID stripe.

12. The method of claim 10, wherein
the memory system further comprises at least one reserved cell region, and
according to a result of determining whether an available reserved cell region exists among the at least one reserved cell region, the recovered plurality of pieces of data of the first data cell region migrate to the available reserved cell region or the first parity cell region.

13. The method of claim 10, further comprising:
detecting a number of pages having ECC failures among a plurality of pages included in the first data cell region; and
determining whether the detected number of pages exceeds a threshold value,
wherein, when the detected number of pages having ECC failures exceeds the threshold value, failure of the first data cell region is detected.

14. The method of claim 10, wherein each of the M data cell regions and the N parity cell regions is a memory chip or a die.

15. A method of operating a memory system, the method comprising:
receiving a read-out request from a host;
calculating a physical address on which a read operation, corresponding to the read-out request, is to be performed;
determining whether a first cell region, corresponding to the physical address, is failed;
recovering a requested portion of data of the first cell region by performing a first Redundant Array of Inexpensive Disk (RAID) recovery using data and RAID parity read from other cell regions, when it is determined that the first cell region is failed;
reading the requested portion of the data of the first cell region when it is determined that the first cell region is not failed;
outputting the requested portion of the data of the first cell region to the host;
selecting a migration mode of a predetermined region of data of the first cell region; and
recovering the predetermined region of data of the first cell region having a size different from the requested portion by performing a second RAID recovery, when it is determined that the first cell region is failed,
wherein, according to a result of the selection, the memory system is operated in a burst mode or a background mode,
in the burst mode, the recovered predetermined region of data of the first cell region is migrated without processing an input and output (IO) request from a host, and
in the background mode, the recovered predetermined region of data of the first cell region is migrated in the background while processing the IO request from the host.

16. The method of claim 15, further comprising:
performing an internal test of a plurality of cell regions of the memory system to determine whether each of the plurality of cell regions is failed by reading information from each of the plurality of cell regions; and
storing results of the internal test,
wherein the first cell region and the other cell regions are among the plurality of cell regions, and
the first cell region is determined to be failed using the stored results of the internal test.

17. The method of claim 15, when it is determined that first cell region is failed, recovering the predetermined region of data of the first cell region comprises:
determining whether to perform the second RAID recovery on and a data migration of the first cell region;
selecting a mode in which the second RAID recovery and data migration are to be performed and a location to migrate the predetermined region of data of the first cell region;
recovering the predetermined region of data of the first cell region by performing the second RAID recovery; and
migrating the recovered predetermined region of data of the first cell region to a second cell region by performing the data migration.

18. The method of claim 17, wherein
determining whether to perform the second RAID recovery and data migration comprises determining a work load according to a request from the host, and a timing of the second RAID recovery and data migration is adjusted in accordance with the work load.

19. The method of claim 17, wherein the physical address is calculated using a logical-to-physical (L2P) table having conversion information between logical addresses and physical addresses, and the L2P table is updated after the data migration from the first cell region to the second cell region is performed.

* * * * *